US008540408B2

(12) United States Patent
Takahashi et al.

(10) Patent No.: US 8,540,408 B2
(45) Date of Patent: Sep. 24, 2013

(54) LAMP LIGHT SOURCE WITH IMPROVED HEAT DISSIPATION

(75) Inventors: Kenji Takahashi, Osaka (JP); Yuji Hosoda, Osaka (JP); Kazushige Sugita, Hyoga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/511,120

(22) PCT Filed: Aug. 29, 2011

(86) PCT No.: PCT/JP2011/004784
§ 371 (c)(1), (2), (4) Date: May 21, 2012

(87) PCT Pub. No.: WO2012/101687
PCT Pub. Date: Aug. 2, 2012

(65) Prior Publication Data

US 2012/0287632 A1 Nov. 15, 2012

(30) Foreign Application Priority Data

Jan. 25, 2011 (JP) ................................ 2011-013104

(51) Int. Cl.
*B60Q 1/00* (2006.01)

(52) U.S. Cl.
USPC ........ 362/547; 362/217.1; 362/218; 362/219; 362/373

(58) Field of Classification Search
USPC . 362/543–549, 181–182, 227, 217.1–217.17, 362/645–652, 362–374, 217.01, 217.11–217.17, 362/218–225, 190–191, 249.1–249.13, 234–294, 362/249.01–249.09, 453–456, 306–310, 362/296.02–296.1, 311.01–311.11, 341, 362/345, 350–351, 800, 362–364, 373, 433–435; 313/318.01–318.12
See application file for complete search history.

(56) References Cited

U.S. PATENT DOCUMENTS

| | | | | |
|---|---|---|---|---|
| 8,251,689 | B2 * | 8/2012 | Custer | 425/174.4 |
| 2006/0227558 | A1 | 10/2006 | Osawa et al. | |
| 2010/0097811 | A1 * | 4/2010 | Betsuda | 362/362 |
| 2010/0237761 | A1 | 9/2010 | Osawa et al. | |
| 2010/0237779 | A1 | 9/2010 | Osawa et al. | |
| 2010/0244650 | A1 | 9/2010 | Osawa et al. | |
| 2010/0244694 | A1 | 9/2010 | Osawa et al. | |
| 2010/0253200 | A1 | 10/2010 | Osawa et al. | |
| 2010/0264845 | A1 * | 10/2010 | Broitzman | 315/294 |
| 2011/0068687 | A1 | 3/2011 | Takahasi et al. | |
| 2011/0089831 | A1 | 4/2011 | Takahasi et al. | |
| 2011/0156569 | A1 | 6/2011 | Osawa et al. | |
| 2011/0309386 | A1 | 12/2011 | Osawa et al. | |
| 2011/0310606 | A1 | 12/2011 | Osawa et al. | |
| 2012/0002421 | A1 | 1/2012 | Takahasi et al. | |
| 2012/0044684 | A1 | 2/2012 | Takahasi et al. | |

FOREIGN PATENT DOCUMENTS

| | | |
|---|---|---|
| JP | 2006-313717 | 11/2006 |
| JP | 2009-059707 | 3/2009 |
| JP | 2010-062005 | 3/2010 |
| WO | WO 2010/090012 | 8/2010 |

* cited by examiner

*Primary Examiner* — Britt D Hanley
*Assistant Examiner* — Fatima Farokhrooz

(57) ABSTRACT

A lamp light source comprises: a light-emitting unit having a plurality of semiconductor light-emitting elements arranged as a ring on a front face of a mount so as to principally emit light in a frontal direction; and a circuit unit converting externally-supplied electrical power to cause the semiconductor light-emitting elements to emit the light, wherein a through-hole passes vertically through the light-emitting unit at a point inside the ring of semiconductor light-emitting elements, the circuit unit is at least partly arranged within the through-hole, and a space is provided between the circuit unit and the light-emitting unit.

20 Claims, 26 Drawing Sheets

LAMP LIGHT SOURCE WITH IMPROVED HEAT DISSIPATION

TECHNICAL FIELD

The present invention relates to a lamp light source using a semiconductor light-emitting element, and particularly relates to miniaturization of a case containing a circuit unit in such a lamp light source.

BACKGROUND ART

In recent years, light bulb-type lamp light sources using a semiconductor light-emitting element such as an LED (Light Emitting Diode) have become a widespread replacement for incandescent light bulbs.

Such lamp light sources typically feature a number of LEDs mounted on a single mounting substrate while a circuit unit for lighting the LEDs is held in the internal space of a case between the back of the mounting substrate and a base. The light produced by the LEDs radiates outward through a globe (see Patent Literature 1).

Also, the case is formed of a metal having thermoconductive properties and thus transmits heat produced by the LEDs to the base. The case is typically made so as not to accumulate heat (see page 12 of Non-Patent Literature 1)

CITATION LIST

Patent Literature

[Patent Literature 1]

Japanese Patent Application Publication 2006-313717

[Non-Patent Literature]

[Non-Patent Literature 1]

"2010 Lamp Catalogue", Publisher: Panasonic Corporation Lighting Company et al.

SUMMARY OF INVENTION

Technical Problem

Conventionally, a lamp light source using a semiconductor light-emitting element requires the case to be large enough to accommodate a circuit unit therein.

The size and dimensions of the lamp thus differ from those of an incandescent light bulb, and as such, the lamp is not always appropriate for mounting in a conventional light fixture intended for an incandescent bulb.

Therefore, demand is growing for a semiconductor light-emitting element-using lamp light source that more closely approximates the size and dimensions of a conventional incandescent bulb be developed by making the case smaller.

However, miniaturizing the case implies a decrease in distance between the semiconductor light-emitting module, i.e., the heat source, and the circuit unit. As a result, the circuit unit is easily affected by the heat from the semiconductor light-emitting module, and the heat produced by the circuit unit itself is not easily dissipated. This leads to a problem in that the heat load imposed on the circuit unit is increased. The electronic components making up the circuit unit include components having a useable life that is dramatically influenced by heat. Therefore, there is a need to constrain increases to the heat load imposed on the circuit unit in order to guarantee a long useable life therefor.

Therefore, the present invention aims to provide a lamp light source configured such that the circuit unit and the semiconductor light-emitting module are in proximity but the heat transmitted to the circuit unit from the semiconductor light-emitting module is constrained.

Solution to Problem

In order to achieve the above-stated aim, one aspect of the present invention provides a lamp light source, comprising: a light-emitting unit having a plurality of semiconductor light-emitting elements arranged as a ring on a front face of a mount so as to principally emit light in a frontal direction; a circuit unit converting externally-supplied electrical power to cause the semiconductor light-emitting elements to emit the light; a globe that is diffusive and transmittant, disposed so as to cover a front side of the light-emitting unit; an envelope that includes a base receiving the externally-supplied electrical power for causing the semiconductor light-emitting elements to emit the light; and a support member arranged at a distance from the light-emitting unit and supporting the circuit unit in relation to the envelope, wherein a through-hole passes vertically through the light-emitting unit at a point inside the ring of semiconductor light-emitting elements, the circuit unit is at least partly arranged within the through-hole, a space is provided between the circuit unit and the light-emitting unit, and the support member forms at least part of a heat transmission pathway from the circuit unit to the base, the support member thermally connecting the circuit unit and the base.

Advantageous Effects of Invention

The lamp light source pertaining to one aspect of the present invention has the circuit unit disposed at least partly in the through-hole within the light-emitting unit. This enables miniaturization of the case and, through the accompanying provision of a space between the light-emitting unit and the circuit unit, constrains heat transmission from the light-emitting unit to the circuit holder while constraining increases to the heat load imposed on the circuit unit in order to guarantee a long useable life therefor.

DESCRIPTION OF EMBODIMENTS

Figure 1:
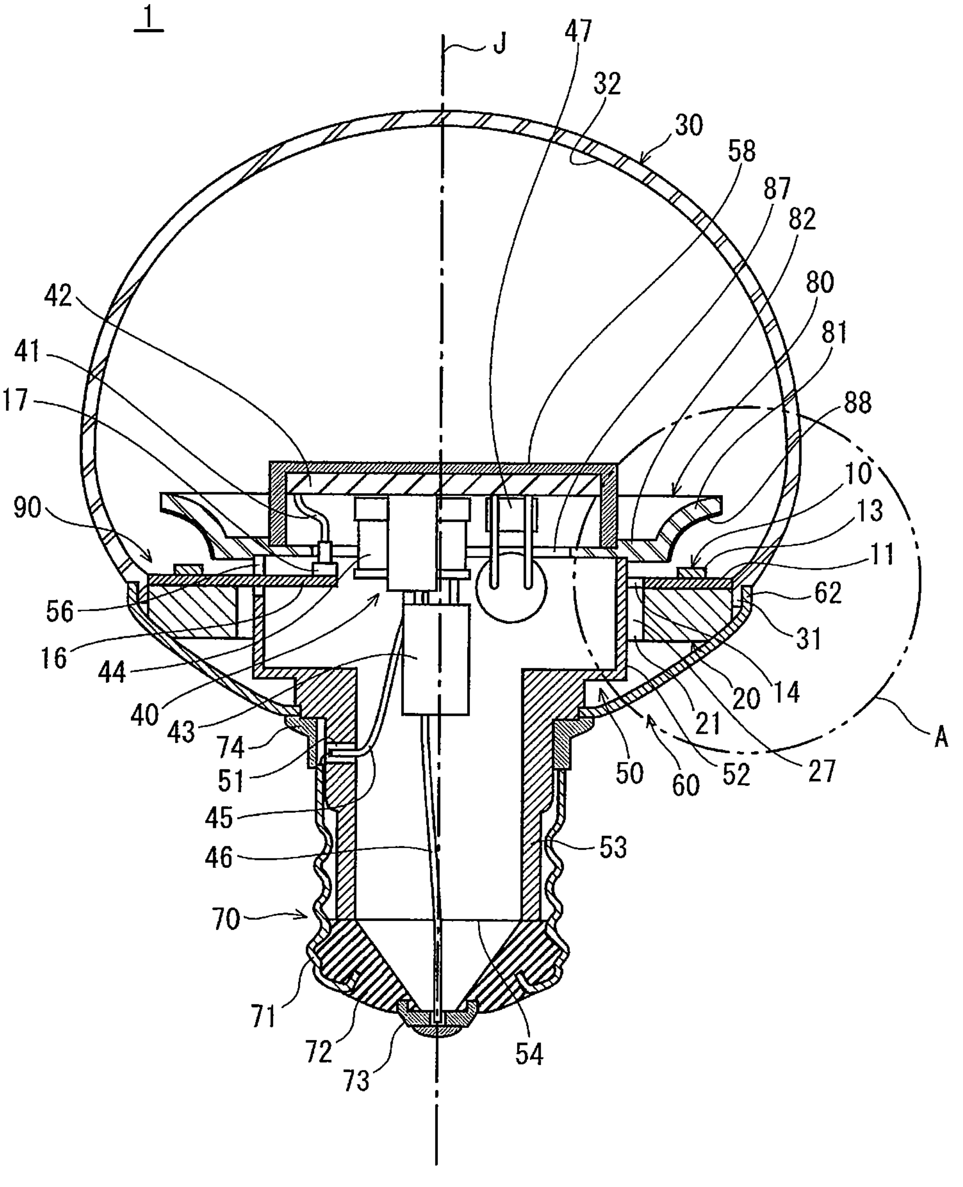
FIG. 1 is a cross-sectional diagram illustrating the overall configuration of a lamp light source pertaining to Embodiment 1.

A light source for a lamp pertaining to the present invention is described below, with reference to the accompanying drawings.

The scale-sized components in the drawings do not conform to reality. In the Embodiments described below, the materials, values, and so on are described by means of examples, and no limitations are intended thereby. Further, appropriate modifications may be made to the present invention provided that these do not deviate from the technical concept of the present invention Further still, combination with elements of other Embodiments is possible, provided that no contradictions arise.

(Embodiment 1)

Overall Configuration

Figure 2:
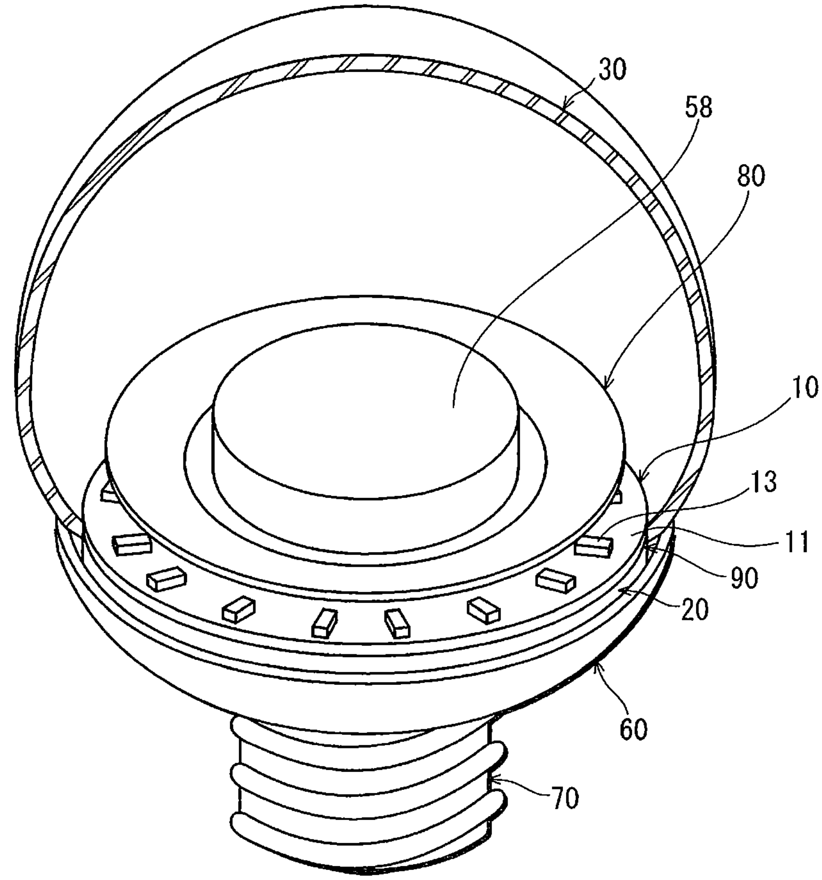
FIG. 2 is a partial-cutaway perspective view diagram illustrating the overall configuration of the lamp light source pertaining to Embodiment 1.
Figure 3:
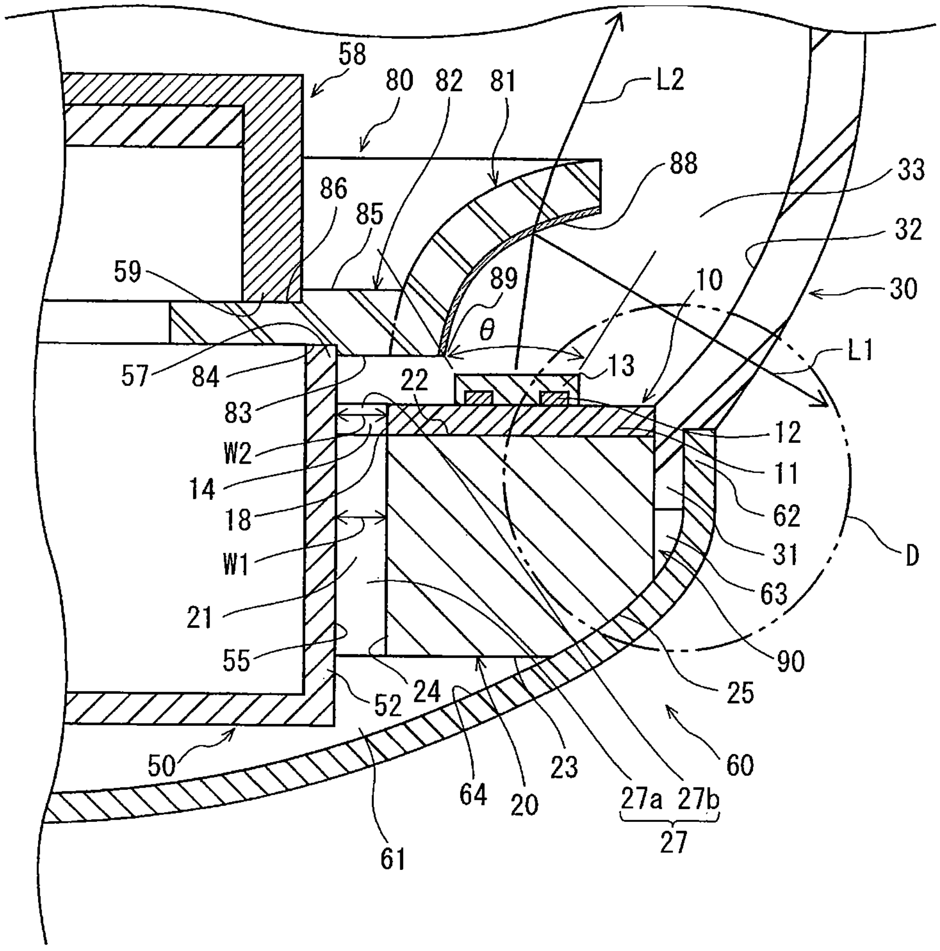
FIG. 3 is a magnified view of portion A in FIG. 1.

FIG. 1 is a cross-sectional diagram illustrating the overall configuration of a lamp light source pertaining to Embodiment 1. FIG. 2 is a partial-cutaway perspective view diagram illustrating the lamp light source pertaining to Embodiment 1. FIG. 3 is a cross-sectional diagram showing a magnified view of section A, encircled by the double-dashed line in FIG. 1. In the drawings, the single-dashed line drawn along the vertical axis of the page represents lamp axis J within the lamp light source. The top of the page corresponds to the front of the lamp light source, while the bottom of the page corresponds to the back of the lamp light source.

As shown in FIGS. 1 through 3, the lamp light source 1 pertaining to Embodiment 1 is an LED lamp intended as a replacement for an incandescent bulb. The lamp light source 1 includes a semiconductor light-emitting module 10 serving as the light source, a mount 20 on which the semiconductor light-emitting module 10 is mounted, a globe 30 covering the semiconductor light-emitting module 10, a circuit unit 40 for lighting the semiconductor light-emitting module 10, a circuit holder 50 holding the circuit unit 40, a case 60 covering the circuit holder 50, a base 70 electrically connected to the circuit unit 40, and a beam splitter 80 diffusing light emitted from the semiconductor light-emitting module 10. The semiconductor light-emitting module 10 and the mount 20 form a light-emitting unit 90. The globe 30, the case 60, and the base 70 form an envelope.

(Component Configuration)

(1) Semiconductor Light-Emitting Module

Figure 4:
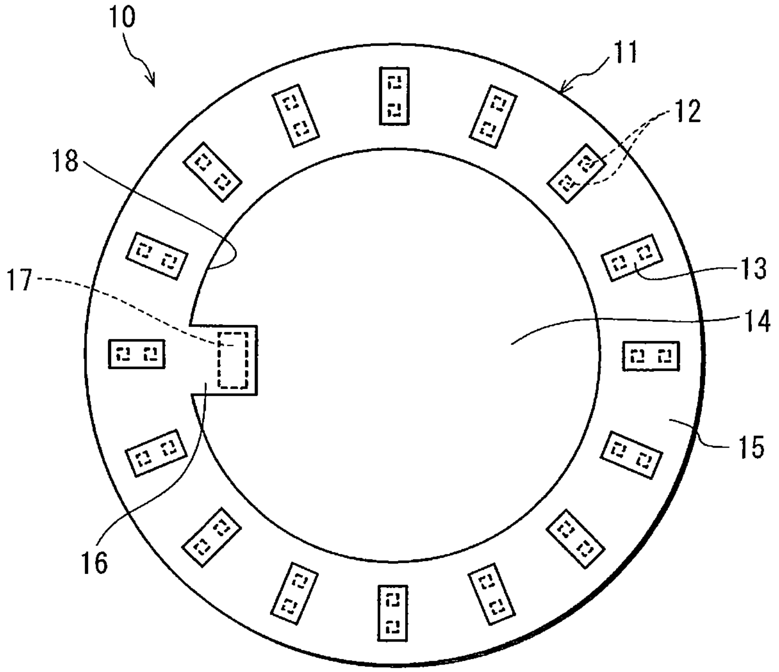
FIG. 4 is a plane-view diagram of a semiconductor light-emitting module pertaining to Embodiment 1.

FIG. 4 is a plane-view diagram of the semiconductor light-emitting module pertaining to Embodiment 1. As shown, the semiconductor light-emitting module includes a mounting substrate 11, semiconductor light-emitting elements 12 serving as the light source and mounted on the mounting substrate 11, and sealers 13 provided on the mounting substrate 11 so as to encapsulate the semiconductor light-emitting elements 12. In the present Embodiment, the semiconductor light-emitting elements 12 are LEDs, as the semiconductor light-emitting module 10 is an LED module. However, the semiconductor light-emitting elements 12 may alternatively be LD (laser diodes) or EL elements (electroluminescent elements).

The mounting substrate 11 is made up of an element mounting portion 15, which is annular and has a substantially circular hole 14 in the middle, and a tongue portion 16, which extends from one part of the inner edge of the element mounting portion 15 toward the middle of the hole 14. A connector 17 is provided on the top face of the tongue portion 16, and is connected to a wire 41 of the circuit unit 40. The semiconductor light-emitting module 10 and the circuit unit 40 are electrically connected through the connection of the wire 41 to the connector 17. While FIG. 4 indicates that the connector 17 is provided on the top face of the tongue portion 16, no limitation is intended. When the mounting substrate 11 is made of a non-conducting material, such as ceramic, the connector 17 may be provided on the back face of the tongue portion 16.

The element mounting portion 15 has, for example, 32 semiconductor light-emitting elements 12 mounted thereon, arranged as a ring on the surface. Specifically, the semiconductor light-emitting elements 12 are combined into pairs, each pair being aligned radially with respect to the element mounting portion 15, and the 16 pairs being arranged along the circumferential direction of the element mounting portion

15 at equal intervals so as to form a ring. The aforementioned ring is not necessarily limited to a circular ring, but is also intended to include other polygons, such as triangular, rectangular, or pentagonal shapes. Accordingly, the semiconductor light-emitting elements 12 may be mounted in a ring that is an oval or polygonal loop.

Each pair of the semiconductor light-emitting elements 12 is sealed by one of the sealers 13, each of which is substantially rectangular. Accordingly, there are 16 sealers 13 in total. The longitudinal direction of each sealer 13 coincides with a radial direction of the element mounting portion 15. When viewed from the front and aligned with the lamp axis J, the sealers appear to be radiating out from lamp axis J.

The sealers 13 are primarily made of a translucent material. However, when the wavelength of the light emitted by the semiconductor light-emitting element 12 is to be converted to a predetermined wavelength, the translucent material may be made to include wavelength converting material performing such a conversion. Silicone resin or the like may be used as the translucent material, while fluorescent particles or the like may be used as the wavelength converting material.

In the present Embodiment, semiconductor light-emitting elements 12 emitting blue light are used in combination with sealers 13 made of a translucent material having fluorescent particles mixed therein that convert blue light into yellow light. Thus, the blue light emitted by the semiconductor light-emitting elements 12 is partly converted into yellow light by the sealers 13, such that the semiconductor light-emitting module 10 emits white light generated by the combination of unconverted blue light with converted yellow light.

Furthermore, the semiconductor light-emitting module 10 may, for example, use semiconductor light-emitting elements producing ultraviolet light in combination with fluorescent particles converting the light produced thereby into three colours (e.g., red, green, and blue). Further still, the wavelength converting material may be any material, such as a semiconductor, a metal compound, an organic dye, or a pigment, capable of absorbing light of a particular wavelength and emitting light of a different wavelength.

The semiconductor light-emitting elements 12 are arranged such that the principal direction of light emission is forward, i.e., along the lamp axis J.

(2) Mount

Again, as shown in FIG. 1, the mount 20 is, for example, substantially tubular and has a substantially cylindrical through-hole 21. The tubular axis is oriented so as to match the lamp axis J. Accordingly, as shown in FIG. 3, the through-hole 21 passes through the mount 20, from a front face 22 to a back face 23 thereof, each face being substantially annular in the plane. The semiconductor light-emitting module 10 is mounted on the front face 22 of the mount 20, and is disposed flatly such that the principal direction of light emission of each semiconductor light-emitting element 12 is oriented forward. The mounting of the semiconductor light-emitting module 10 on the mount 20 may be achieved by various means, such as through the use of screws, adhesive, or engagement.

The front face 22 is not limited to being substantially annular, but may have any shape. Similarly, the front face 22 need not necessarily be completely flat, provided that the semiconductor light-emitting elements can be arranged flatly thereon. The same applies to the back face 23.

The mount 20 is, for example, made of a metallic material. The metal in question may be Al, Ag, Au, Ni, Rh, Pd, an alloy combining two or more of these metals, or an alloy of Cu and Ag. Such a metallic material has advantageous thermal conductivity, and is thus able to effectively conduct the heat produced by the semiconductor light-emitting module 10 to the case 60.

The through-hole 21 enables miniaturization, which is achieved by arranging part of the circuit unit 40 in the through-hole 21 and in the globe 30, passing through the through-hole 21. In addition, the through-hole 21 provided in the mount 20 serves to reduce the weight of the lamp light source 1.

(3) Globe

Again, as shown in FIG. 1, in the present Embodiment, the globe 30 is shaped so as to resemble the bulb of a ball-shaped Japanese type G light bulb. An open edge 31 of the globe 30 is fixed to the mount 20 and to the case 60. The envelope of the lamp light source 1 is formed by the globe 30, the case 60, and the base 70. The shape of the globe 30 is not limited to resembling the aforementioned G-type bulb, but may have any desired shape. Furthermore, the lamp light source need not have a globe at all.

The globe 30 has an inner face 32 that diffuses the light emitted by the semiconductor light-emitting module 10. For example, the inner face 32 may be treated with silica or with a white pigment so as to achieve light diffusion. Light incident on the inner face 32 of the globe 30 passes through the globe 30 and reaches the outside atmosphere.

(4) Circuit Unit

The circuit unit 40 lights the semiconductor light-emitting element 12, and includes a circuit substrate 42 having electronic components 43, 44, and 47 mounted thereon. The drawings show only a subset of electronic components with reference signs. The circuit unit 40 is held in the circuit holder 50 and affixed thereto by, for example, the use of screws, adhesive, engagement, and so on.

The circuit substrate 42 is oriented such that a principal surface thereof is substantially perpendicular to lamp axis J and affixed to an inner bottom surface of a lid 58 of the later-described circuit holder 50 by adhesive or similar. Accordingly, the circuit unit 40 is compactly held in the circuit holder 50. Also, the circuit unit 40 is arranged such that heat-sensitive electronic components 43 is positioned far from the semiconductor light-emitting module 10 while heat-resistive electronic component 44 is positioned close to the semiconductor light-emitting module 10. Accordingly, heat-sensitive electronic component 43 is less susceptible to heat damage from the heat produced by the semiconductor light-emitting module 10.

The circuit unit 40 and the base 70 are electrically connected through electric wires 45 and 46. Electric wire 45 passes a through-hole 51 provided in the circuit holder 50 and is connected to a shell portion 71 of the base 70. Similarly, the electric wire 46 passes through a rear opening 54 of the circuit holder 50 and is connected to an eyelet portion 73 of the base 70.

The circuit unit 40 is partly arranged in the through-hole 21 of the mount 20 and in the globe 30. Accordingly, less space is required to accommodate the circuit unit 40, which is farther back than the mount 20. Thus, the distance between the mount 20 and the base 70 is decreased, enabling a reduction in the diameter of the case 60, which is advantageous for miniaturizing the lamp light source 1. The portion of the circuit unit 40 may be held only in the through-hole 21 without reaching the interior of the globe 30. In such circumstances, the space for accommodating the circuit unit 40 behind the mount 20 may be correspondingly reduced.

(5) Circuit Holder

The circuit holder 50 is made up of a large-diameter portion 52, a small-diameter portion 53, and the lid 58. The large-diameter portion 52 and the small-diameter portion 53 are, for example, substantially cylindrical with an opening at each end, connected and oriented so as to have a common axis that coincides with the lamp axis J to form a single unit. The large-diameter portion 52 is positioned toward the front and contains a large part of the circuit unit 40. In contrast, the small-diameter portion 53 is positioned toward the back and has the base 70 fit thereon, thus closing the rear opening 54 of the circuit holder 50.

The lid 58 is, for example, shaped as a bottomed cylinder or as a cap, is held by the large-diameter portion 52, via the beam splitter 80, such that a bottom of the lid is oriented toward the front of the large-diameter portion 52, and thereby closes the openings of the large-diameter portion 52 and of the beam splitter 80.

The circuit holder 50 has a through-hole 56 provided at a position corresponding to that of the tongue portion 16 of the semiconductor light-emitting module 10. The front edge of the tongue portion 16 is inserted into the circuit holder 50 through the through-hole 56, such that the connector 17 provided on the tongue portion 16 comes to be positioned in the circuit holder 50.

The circuit holder 50 may be formed of resin or of a similar insulating material. Also, the lid 58 is not limited to being shaped as a bottomed cylinder or cap. The lid 58 may, for example, be a cone, polygonal prism or pyramid, or any desired shape provided that the light from the semiconductor light-emitting module 10 is not obstructed thereby upon passing through the beam splitter 80.

(6) Case

The case 60 is, for example, shaped as a round tube open at both ends, having a diameter that decreases toward the back, or is shaped as a bowl with an opening at the bottom thereof. As shown in FIG. 3, the mount 20 and the open edge 31 of the globe 30 are accommodated in a forward edge portion 62 of the case 60. The case 60, the mount 20, and the globe 30 are fixed as a single unit by, for example, using an adhesive introduced in space 63 (an installation groove) surrounded by the aforementioned components.

The outer circumferential surface of a rear edge portion of the mount 20 is tapered to match the inner circumferential of the case 60. Thus, a tapered face 25 is in surface contact with an inner face 64 of the case 60 and transmits heat from the semiconductor light-emitting module 10 to the mount 20. This also causes heat to be more easily transmitted to the case 60. The heat produced by the semiconductor light-emitting elements 12 is mainly transmitted through the mount 20 and the case 60 to the small-diameter portion 53 of the circuit holder 50 to reach the base 70, before being dissipated by the base 70 to a non-diagrammed light fixture.

The tapered face 25 completely matches the inner face 64 of the case 60. As such, the tapered face 25 and the inner face 64 of the case 60 are combined in cohesive, gapless contact. Accordingly, the light from the semiconductor light-emitting module 10 does not escape into a gap 61. Alternatively, the tapered face 25 and the inner face 64 of the case 60 may be joined by a non-transparent adhesive or the like, so as to secure the cohesiveness between the two components.

The case 60 is, for example, made of a metallic material. The metal in question may be Al, Ag, Au, Ni, Rh, Pd, an alloy combining two or more of these metals, or an alloy of Cu and Ag. Given that such a metallic material is suited to thermal conduction, the heat transmitted by the case 60 is effectively transmitted toward the base 70.

(7) Base

When the lamp light source 1 is affixed to a light fixture and lit, the base 70 serves to receive electric power from a socket of the light fixture. In the present Embodiment, an E26 Edison screw base is used. However, no limitation is intended regarding the type of base 70 employed. The base 70 is substantially cylindrical and includes a shell portion 71 formed as a male screw along the outer circumferential surface of the base 70 as well as an eyelet portion 73 mounted to the shell portion 71 through an insulating member 72. An insulating member 74 is introduced between the shell portion 71 and the case 60.

(8) Beam Splitter

Figure 5:
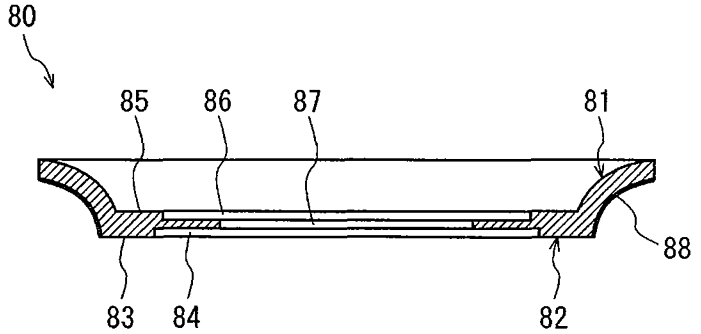
FIG. 5 is a cross-sectional diagram of a beam splitter pertaining to Embodiment 1.

FIG. 5 is a cross-sectional diagram of a beam splitter pertaining to Embodiment 1. As shown, the beam splitter 80 is, for example, a bottomed cylinder that includes a main body 81, which is substantially tubular and open at both ends, and an attaching portion 82, which is substantially annular and closes a rear opening of the main body 81. The beam splitter 80 is attached to the forward edge portion 57 of the circuit holder 50. For example, in FIG. 3, the boundary between the main body 81 and the attaching portion 82 is marked by a double-chained line.

A back face 83 of the attaching portion 82 has a recess 84 that is substantially cylindrical and engages with a forward edge portion 57 of the large-diameter portion 52. Fitting the forward edge portion 57 into the recess 84 positions the beam splitter 80 with respect to the large-diameter portion 52. The beam splitter 80 is fixed to the large-diameter portion 52 in this position, through the use of an adhesive or similar. Shaping the forward edge portion 57 of the large-diameter portion 52 to match the recess 84 enables the beam splitter 80 to be appropriately positioned with respect to the semiconductor light-emitting elements 12 through the simple action of fitting the forward edge portion 57 in the recess 84.

Similarly, the front face 85 of the attaching portion 82 is provided with a recess 86 that is substantially cylindrical and engages with a rear edge portion 59 of the lid 58 of the circuit holder 50. The cap-shaped lid 58 is attached to the beam splitter 80 by fitting and fixing the rear edge portion 59 in the recess 86.

The attaching portion 82 has a substantially round hole 87 provided at the approximate centre thereof. The gap in the circuit holder 50 and the gap in the lid 58 are in communication through the hole 87. Accordingly, the part of the circuit unit 40 accommodated within the large-diameter portion 52 and the small-diameter portion 53 of the circuit holder 50 is also accommodated within the hole 87 and the lid 58. Also, providing the hole 87 prevents the beam splitter 80 from interfering with the accommodation of the circuit unit 40.

The beam splitter 80 is made of a translucent material. The translucent material is, for example, a polycarbonate or similar resin, glass, or ceramic. In addition, reflective processing is applied to an outer circumferential surface 88 of the main body 81. The reflective processing may applied to the outer circumferential surface 88 using, for example, a reflective membrane such as a metallic thin-film or dielectric multilayer shaped using thermal evaporative deposition, electron beam evaporation deposition, sputtering, plating, or similar methods.

As shown in FIG. 1, the main body 81 is substantially tubular, having a diameter that is smallest at the back and gradually increases toward the front. When the front is viewed from the back along lamp axis J, the outer circumferential surface 88 of the main body 81 appears annular. When the main body 81 is oriented such that a tubular axis thereof is perpendicular to the front face 22 of the mount 20, the main body 81 is separated from the semiconductor light-emitting module 10 and arranged in front of the semiconductor light-emitting elements 12. The front of the semiconductor light-emitting elements 12, which are arranged as a ring, is thus covered by the annular outer circumferential surface 88. As such, the semiconductor light-emitting elements 12 and the outer circumferential surface 88 are arranged opposite each other. That is, the principal direction of light emission for the semiconductor light-emitting elements 12 is toward the outer circumferential surface 88, and the outer circumferential surface 88 serves as a light-receiving surface for the beam splitter 80.

The light emitted from the semiconductor light-emitting module 10 and incident on the outer circumferential surface 88 of the main body 81 is partly reflected obliquely backward by the outer circumferential surface 88 so as to avoid the front face 22 of the mount 20. The direction is indicated by optical path L1 in FIG. 3. Also, another part of the light passes through the main body 81 and on toward the front, as indicated by optical path L2 in FIG. 3. That is, the function of the beam splitter 80 is mainly utilized by the main body 81.

The main body 81 is provided so as to reflect a part of the light emitted by the semiconductor light-emitting element 12 obliquely backward, avoiding the front face 22 of the mount 20. Thus, the lamp light source 1 exhibits advantageous light distribution characteristics despite the narrow lighting angle of individual semiconductor light-emitting elements 12. Further, given that the semiconductor light-emitting elements 12 are arranged in a ring and that the outer circumferential surface 88 is correspondingly annular, the light reflected obliquely backward and avoiding the front face 22 of the mount 20 spreads over the entire exterior of the mount 20. Accordingly, the light distribution characteristics are advantageous across the entire circumference centered on lamp axis J.

Further still, the main body 81 not only reflects a part of the light but also allows another part of the light to pass. The beam splitter 80 is thus highly unlikely to produce a shadow, which leads to an advantage in terms of design when the lit lamp light source 1 is viewed head-on.

As such, the provision of the beam splitter 80 allows the outgoing light from the semiconductor light-emitting module 10 to be diffused and, given that the light is unlikely to be obstructed by the lid 58, allows the circuit unit 40 to be arranged farther ahead than the semiconductor light-emitting module 10. This enables miniaturization of the case 60, which accommodates these components.

In the present Embodiment, a reflective processing is applied to the outer circumferential surface 88 such that the beam splitter 80 has reflectivity on the order of 50% (for the outer circumferential surface 88), and transmittance on the order of 50% (for the outer circumferential surface 88). The reflectivity is desirably 50% or higher in order to maintain advantageous light distribution for the lamp light source 1. Similarly, the transmittance is desirably 40% or higher in order to maintain an advantageous design for the lamp light source 1. In brief, assuming 0% absorptance, the main body 81 desirably exhibits reflectivity ranging from 50% to 60% inclusive, and transmittance ranging from 40% to 50% inclusive.

The reflectivity and transmittance need not be uniform across the entirety of the outer circumferential surface 88, but may be made to vary in different regions. For example, when less light is to be reflected toward the back and more light is to be reflected toward the sides, the reflectivity of the outer circumferential surface 88 may be increased at the back and decreased at the front. Conversely, when more light is to be reflected toward the back and less light is to be reflected toward the sides, the reflectivity of the outer circumferential surface 88 may be decreased at the back and increased at the front.

As shown in FIG. 3, the sealers 13 of the semiconductor light-emitting module 10 are directly under the main body 81 when viewed from the front along lamp axis J. The sealers 13 are entirely covered by the beam splitter 80. A rear edge 89 (i.e., the edge nearest lamp axis J) of the outer circumferential surface 88 is arranged at the limit of the illuminatingle angle θ of the semiconductor light-emitting element 12 nearest lamp axis J, or closer to lamp axis J than the limit. According to this structure, emitted light is unlikely to enter the gap between the back face 83 of the beam splitter 80 and the semiconductor light-emitting module 10, thereby preventing light loss.

The outer circumferential surface 88 of the main body 81 is shaped as a concave plane, having an inward concavity facing the tubular axis of the main body 81. Specifically, as shown in FIG. 1, the outer circumferential surface 88 is substantially arc shaped, curving toward lamp axis J when seen in cross-section (i.e., a vertical cross-section) of the main body 81 taken along a virtual plane that includes lamp axis J (i.e., coincides with the tubular axis of the main body 81). In other words, the arc shape curves more toward the lamp axis J than toward a straight line in the vertical cross-section joining the rear edge 89 of the outer circumferential surface 88 to a front edge thereof (Circuit Unit Heat Load Suppression)

As shown in FIG. 1, the large-diameter portion 52 of the circuit holder 50 passes through the through-hole 21 of the mount 20, being disposed therein such that a part of the circuit unit 40 is accommodated within the circuit holder 50. As shown in FIG. 3, the large-diameter portion 52 of the circuit holder 50 is not in contact with the mount 20, resulting in gap (space) 27*a* therebetween. In other words, gap 27*a* is provided between the exterior 55 (outer circumferential surface) of the large-diameter portion 52 of the circuit holder 50 and the inner face 24 (inner face of the mount 20) of the through-hole 21 of the mount 20. Width W1 of gap 27*a*, is given as measured perpendicularly with respect to lamp axis J, and is substantially uniform along the entirety of the circuit holder 50. Providing gap 27*a* between the circuit holder 50 and the mount 20 in this way makes heat less likely to be transmitted from the mount 20 to the circuit holder 50. Accordingly, the circuit holder 50 is less likely to reach high temperatures, and the circuit unit 40 is less likely to suffer heat damage. In order to suppress the transmission of heat from the mount 20 to the circuit holder 50, W1 should desirably be from 0.3 mm to 1 mm, inclusive.

The semiconductor light-emitting module 10 is not in contact with the large-diameter portion 52 of the circuit holder 50. Gap (space) 27*b* is provided between the mounting substrate 11 of the semiconductor light-emitting module 10 and the large-diameter portion 52 of the circuit holder 50. In other words, gap 27*b* is provided between the exterior 55 of the large-diameter portion 52 of the circuit holder 50 and the inner face 18 of the mounting substrate 11. Width W2 of gap 27*b* is given as measured perpendicularly with respect to lamp axis J, and is substantially uniform along the entirety of the large-diameter portion 52 of the circuit holder 50, with the exception of the tongue portion 16. Accordingly, the semiconductor light-emitting module 10 is less likely to transmit heat to the circuit holder 50, the circuit holder 50 is less likely to reach high temperatures, and the circuit unit 40 is less likely to suffer heat damage. In order to suppress the transmission of heat from the semiconductor light-emitting module 10 to the circuit holder 50, W2 should desirably be from 0.3 mm to 1 mm, inclusive.

In the present Embodiment, the front face 22 of the mount 20 and the back face of the element mounting portion 15 have substantially identical shapes. Also, the semiconductor light-emitting module 10 is positioned such that the front face 22 of the mount 20 and the back face of the element mounting portion 15 fit. As such, W1 and W2 are substantially equal. The gaps 27*a* and 27*b* form a single, undivided gap (space) 27. Given that the front face 22 of the mount 20 and the back face of the element mounting portion 15 have substantially identical shapes, the semiconductor light-emitting module 10 is easy to position with respect to the mount 20, and W2 can be made uniform along the entire circumference of the circuit holder 50.

As described above, gap 27*a* is provided between the circuit holder 50 and the mount 20 while gap 27*b* is provided between the circuit holder 50 and the semiconductor light-emitting module 10. That is, gap 27 is provided between the circuit holder 50 and the light-emitting unit 90. As such, transmission of heat produced in the semiconductor light-emitting module 10 to the circuit holder 50 is suppressed, and the heat load on the circuit unit 40 is prevented from increasing.

Also, the heat produced by the electronic components making up the circuit unit 40, i.e., the heat produced by the circuit unit 40 itself, is transmitted from the circuit substrate 42 to the lid 58 and the beam splitter 80, then further transmitted to the large-diameter portion 52, the small-diameter portion 53, and the base 70, to be ultimately dissipated by the base 70 to the lighting fixture in which the lamp light source 1 is installed, and to the wall, pillar, or other structure carrying the fixture.

Furthermore, as described above, gap 27 is provided between the circuit holder 50 and the light-emitting unit 90. Thus, air easily circulates within the envelope formed by the globe 30, the case 60, and the base 70. That is, space 33 in the globe 30 and space 61 behind the mount 20 in the case 60 allow air to circulate therethrough, thus making high local temperatures less likely to arise within the envelope.

Furthermore, given that the circuit unit 40 and the semiconductor light-emitting module 10 are arranged close together, the length of the wire 41 used to supply electric power from the circuit unit 40 to the semiconductor light-emitting module 10 can be reduced, thus effectuating reductions in material consumption and in production costs.

(Embodiment 2)

Embodiment 1 describes gap 27, provided between the light-emitting unit 90 and the circuit holder 50 to suppress the transmission of heat produced in the semiconductor light-emitting module 10 to the circuit holder 50 and reduce the heat load on the circuit unit 40.

However, the heat load imposed on the circuit unit 40 involves not only heat from the semiconductor light-emitting module 10 but also heat produced by the circuit unit 40 itself. In Embodiment 1, the heat produced by the circuit unit 40 is transmitted from the circuit substrate 42 to the lid 58, the beam splitter 80, the large-diameter portion 52, the small-diameter portion 53, and the base 70, to be ultimately dissipated by the base 70 to the light fixture in which the lamp light source 1 is installed and to the wall, pillar, or similar supporting the fixture. Given that the circuit holder 50 forms part of the heat transmission pathway, the temperature of the circuit holder 50 may rise, in turn causing the air in the circuit holder 50 to rise in temperature and potentially causing an increase in the heat load imposed on the circuit unit 40. Additionally, although the through-hole 56 enables the air inside and outside the circuit holder 50 to remain in communication, the through-hole 56 is only as large as needed for the tongue portion 16 to be inserted. Thus, the inside of the circuit holder 50 is almost hermetic and little air circulates between the inside and outside thereof. Therefore, air tends to stagnate within the circuit holder 50. As a result, high local temperatures arise and may lead to an increased heat load being imposed on the circuit unit 40.

The present Embodiment describes a configuration in which such high local temperatures within the circuit holder 50 are suppressed, thus constraining the heat load imposed on the circuit unit 40.

In order to avoid redundant explanation, portions identical to Embodiment 1 are omitted or abbreviated below. Also, identical components use the same reference signs.

Figure 6:
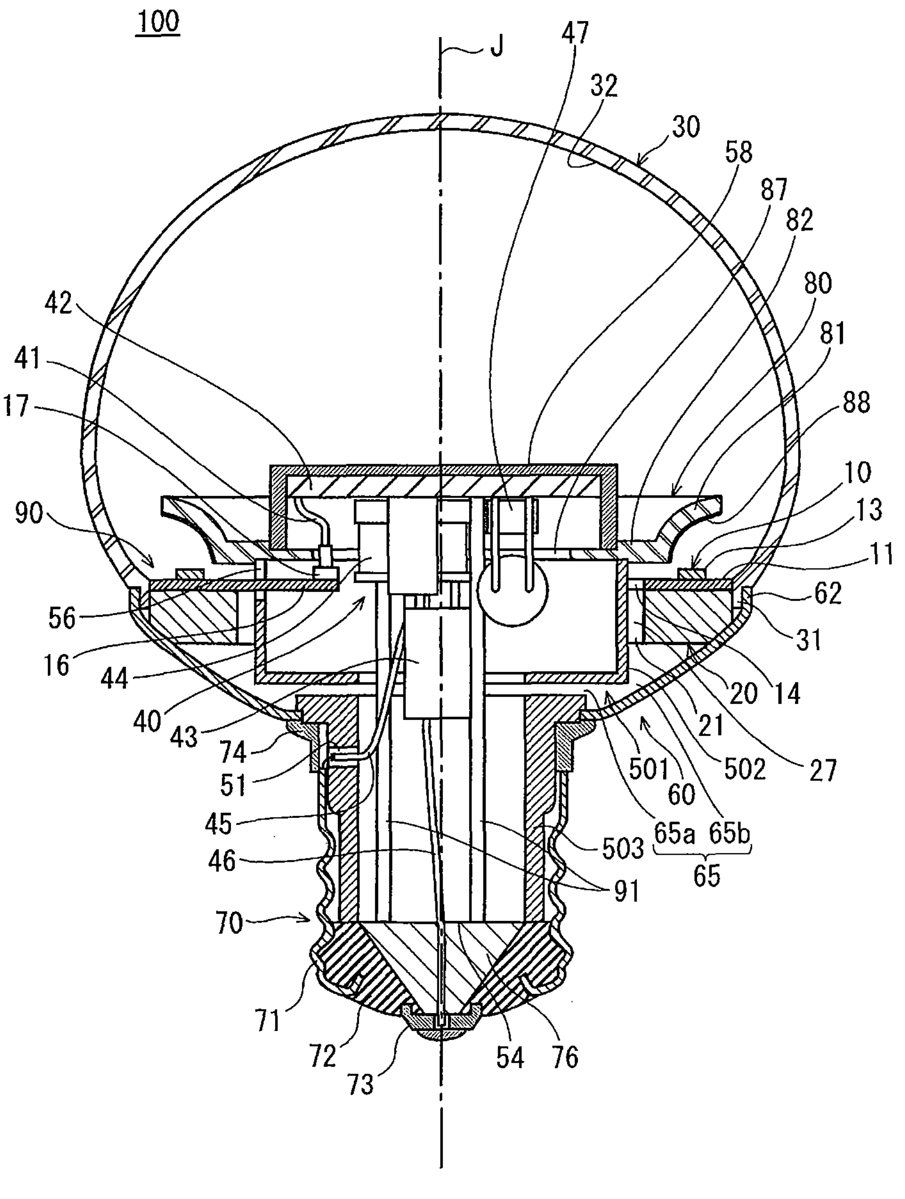
FIG. 6 is a cross-sectional diagram illustrating the overall configuration of a lamp light source pertaining to Embodiment 2.

FIG. 6 is a cross-sectional diagram illustrating the overall configuration of a lamp light source pertaining to Embodiment 2.

A support base 76 formed of insulating resin material or the like is provided in the recess formed by the insulating member 72 and the eyelet portion 73 of the base 70 and fixed therein. The support base 76 supports two columnar support members 91, which extend substantially parallel to lamp axis J. The circuit substrate 42 of the circuit unit 40 is fixed to the end of the support members 91 opposite the end supported by the support base 76 by means of an adhesive made of insulating material, such as resin.

The support members 91 are, for example, made of a metallic material. The metal in question may be Al, Ag, Au, Ni, Rh, Pd, an alloy combining two or more of these metals, or an alloy of Cu and Ag. The heat transmission characteristics of such metals enable the heat generated by the circuit unit 40 to be more efficiently transmitted to the base 70.

Although the present Embodiment describes two support members 91, no limitation is intended. A single support member may also be used, as may three or more support members.

In Embodiment 1, the large-diameter portion 52 and the small-diameter portion 53 of the circuit holder 50 (see FIG. 1) form a single whole. However, as shown in FIG. 6, in Embodiment 2 a large-diameter portion 502 (corresponding to the large-diameter portion 52 of Embodiment 1) of a circuit holder 501 is separated from a tubular portion 503 (corresponding to the small-diameter portion 53 of Embodiment 1), and a gap 65*a* is provided between the two components. The lid 58 and the large-diameter portion 502 form a circuit holder main body. In the present Embodiment, the circuit holder 501 may be formed of resin or of a similar insulating material.

Also, when, for example, the lid 58 is not included, the circuit holder main body may be formed from the large-diameter portion 502 alone.

Furthermore, gap 65*b* is provided between the large-diameter portion 502 and the case 60. Gap 65 is formed by the communicating gaps 65*a* and 65*b*. Accordingly, the circuit holder main body (i.e., the large-diameter portion 502 and the lid 58) and the circuit unit 40 are supported by the support members 91 as a single whole, and are not connected to any components other than the wire 41 and the connector 17. Therefore, not only is the direct transmission of heat from the semiconductor light-emitting module 10 to the circuit holder main body constrained, but so is the transmission of heat from the semiconductor light-emitting module 10 to the case 60 and the base 70 and on to the circuit holder main body.

The heat produced by the circuit unit 40 is then transmitted from the circuit substrate 42 through the support members 91 and the support base 76 to the base 70, to be dissipated by the base 70 to a light fixture in which the lamp light source 100 is installed, and to the wall, pillar, or other structure carrying the fixture.

Also, the space in the circuit holder main body and the space in the tubular portion 503 are in communication with space 61 through gap 65 (see FIG. 3). Space 61 is in communication with space 33 in the globe 30 through gap 27.

Accordingly, the spaces in the circuit holder main body and the tubular portion 503 are in communication with space 33 through gap 65, space 61, and gap 27. As a result, air circulates through the gaps.

As described above, in the present Embodiment, gap 27 is provided between the light-emitting unit 90 and the circuit holder main body to suppress transmission of heat produced by the semiconductor light-emitting module 10 to the circuit holder main body, and the transmission of heat produced by the circuit unit 40 through the support members 91 to the base 70 is enabled. Also, the space in the circuit holder main body and the tubular portion 503 and space 33 in the globe 30 are in communication via gap 65, space 61, and gap 27, thus encouraging air circulation. Thus, high local temperatures are prevented from arising in the space within the circuit holder main body and the tubular portion 503, and an effective constraint is placed on the heat load imposed on the circuit unit 40.

(Variations)

The following variations are also possible. In order to avoid redundant explanation, portions identical to Embodiments 1 and 2 are omitted or abbreviated below. Also, identical components use the same reference signs.

Figure 7:
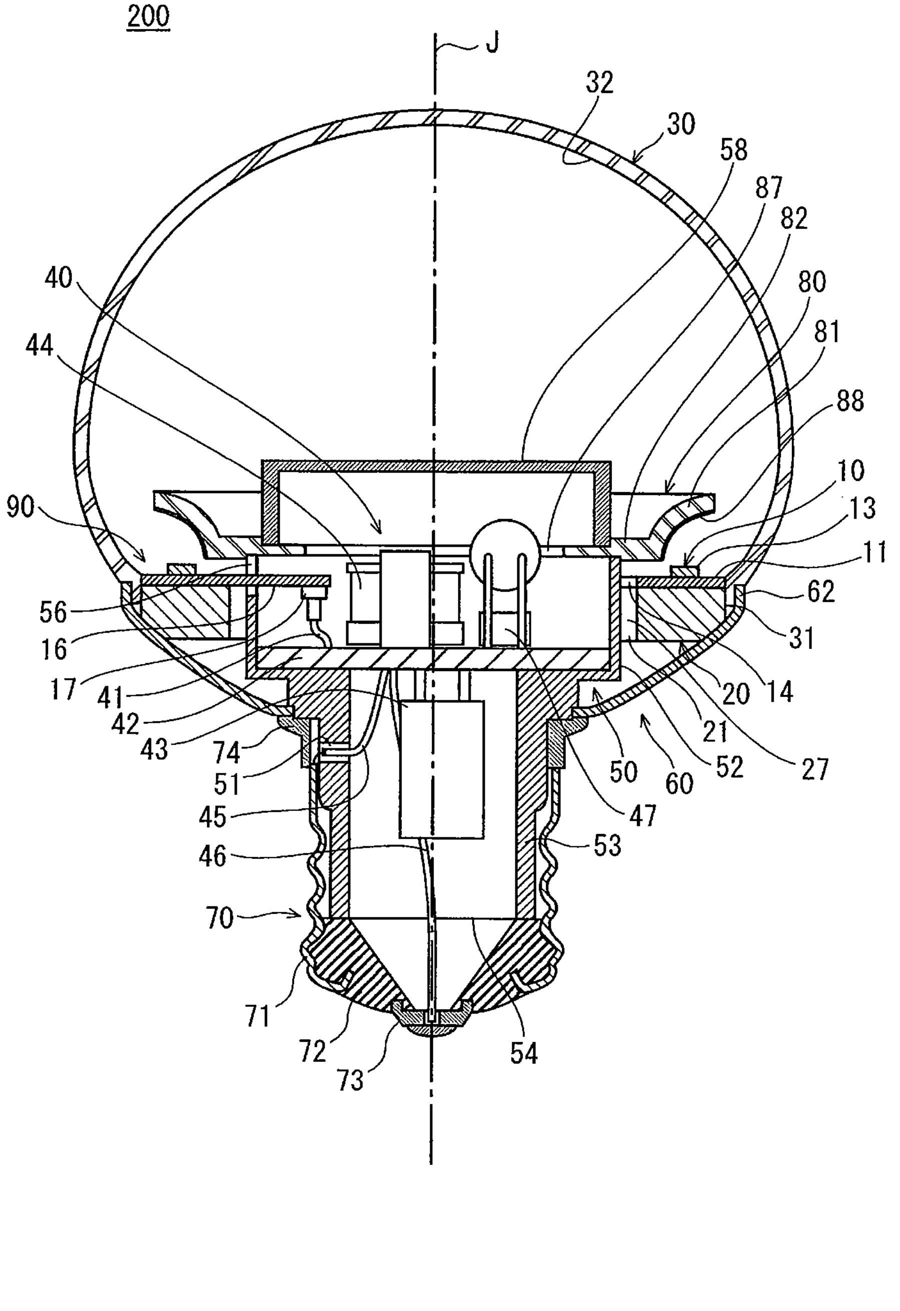
FIG. 7 is a cross-sectional diagram illustrating the overall configuration of a lamp light source pertaining to a first variation.

(1) Embodiment 1 describes circuit substrate 42 as being fixed to the lid 58. However, no limitation is intended. As shown in FIG. 7, the circuit substrate 42 may instead be fixed to the bottom face of the large-diameter portion 52 and to the front end of the small-diameter portion 53. In such circumstances, gap 27 is still provided between the circuit holder 50 and the light-emitting unit 90. Thus, the transmission of heat from the light-emitting unit 90 to the circuit holder 50 is suppressed and the heat load on the circuit unit 40 is prevented from increasing.

Further, heat-sensitive electronic components 43 may be arranged on the back face of the circuit substrate 42, i.e., on the principal surface thereof farther from the semiconductor light-emitting module 10. This constrains the effect of the heat produced by the semiconductor light-emitting module 10 on the electronic components 43.

Figure 8:
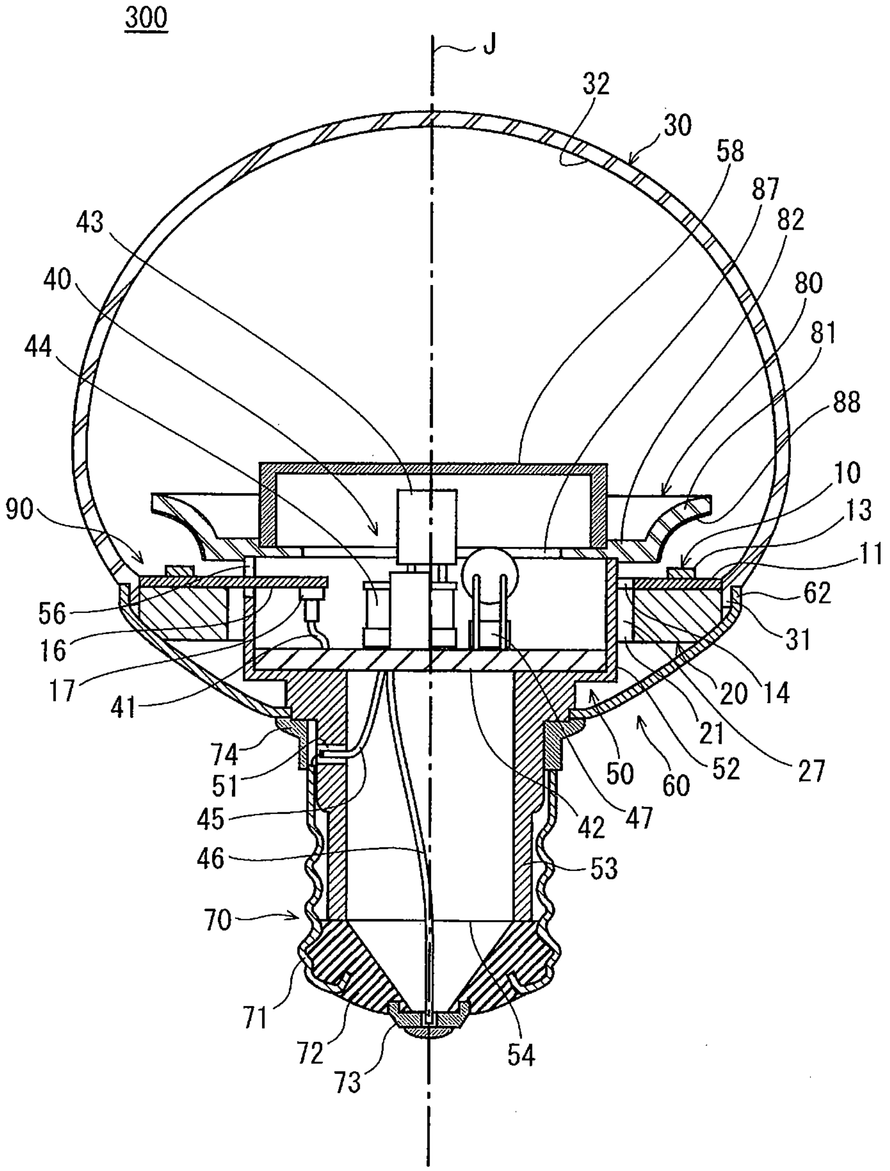
FIG. 8 is a cross-sectional diagram illustrating the overall configuration of a lamp light source pertaining to a second variation.

(2) When, for example, in the first variation described above, the base 70 has a small diameter and the small-diameter portion 53 is not easily able to accommodate the electronic components 43, then as shown in FIG. 8, the electronic components 43 may be arranged on the front face of the circuit substrate 42 along with other electronic components, i.e., arranged on the side closer to the semiconductor light-emitting module 10. In such circumstances, gap 27 is still provided between the circuit holder 50 and the light-emitting unit 90. Thus, the transmission of heat from the light-emitting unit 90 to the circuit holder 50 is suppressed and the heat load on the circuit unit 40 is prevented from increasing.

Also, the electronic components 43 may be arranged so as to be accommodated within the lid 58. As such, the electronic components 43 are arranged as far away as possible from the semiconductor light-emitting module 10, suppressing the effect of heat produced by the semiconductor light-emitting module 10 on the electronic components 43.

Figure 9:
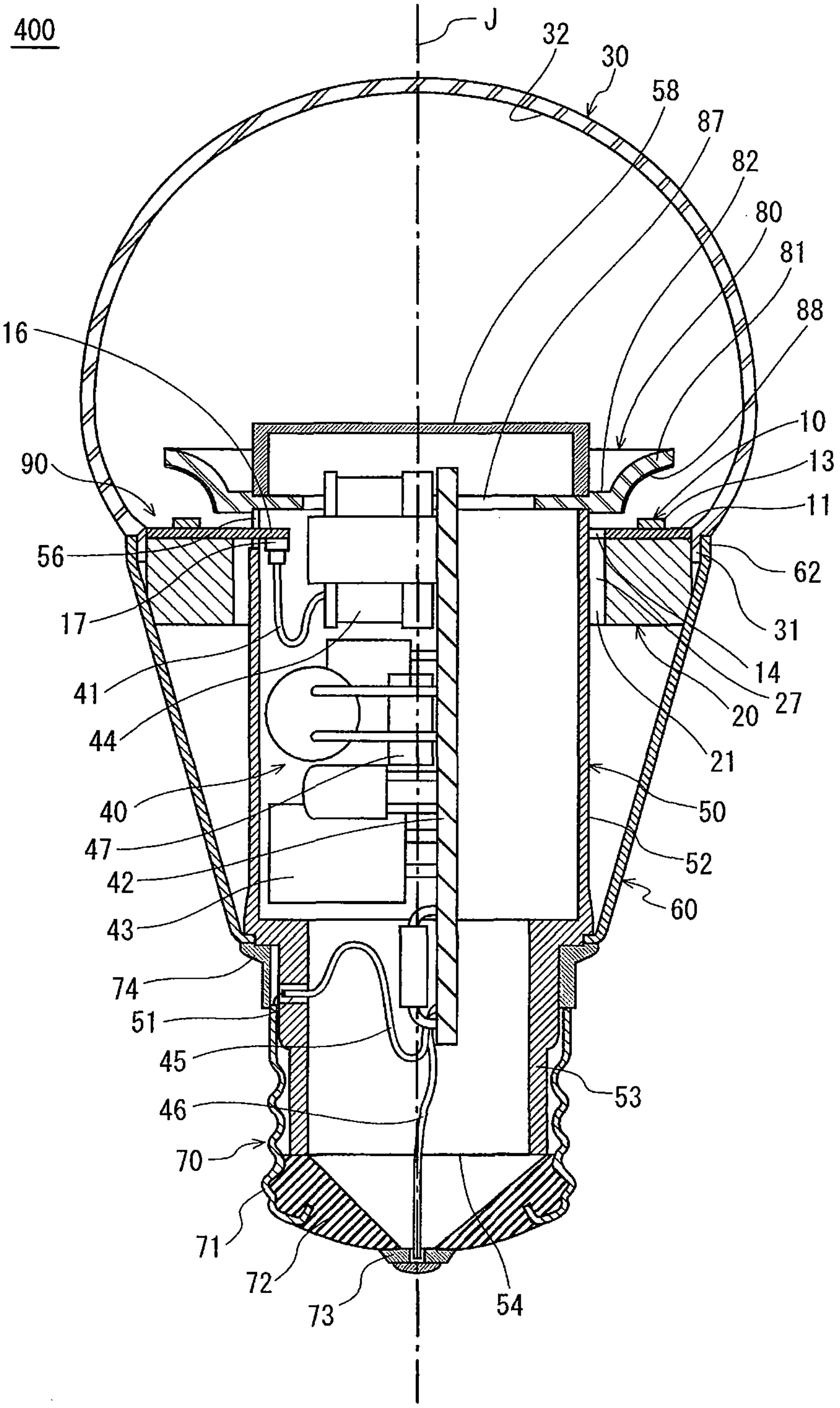
FIG. 9 is a cross-sectional diagram illustrating the overall configuration of a lamp light source pertaining to a third variation.

(3) In the Embodiments and variations described above, the circuit substrate 42 is oriented such that the principal surface thereof is substantially orthogonal to lamp axis J. However, no limitation is intended. For example, as shown in FIG. 9, the circuit substrate 42 may be oriented such that the principal surface thereof is oriented substantially parallel to lamp axis J. Accordingly, a small-diameter lamp light source 400 can nevertheless be made to compactly accommodate the circuit unit 40 in the circuit holder 50. In such circumstances, the gap 27 is still provided between the circuit holder 50 and the light-emitting unit 90. Thus, the transmission of heat from the light-emitting unit 90 to the circuit holder 50 is suppressed and the heat load on the circuit unit 40 is prevented from increasing. This variation is ideally applicable to a lamp light source shaped so as to resemble a typical Japanese type A light bulb, for example.

Figure 10:
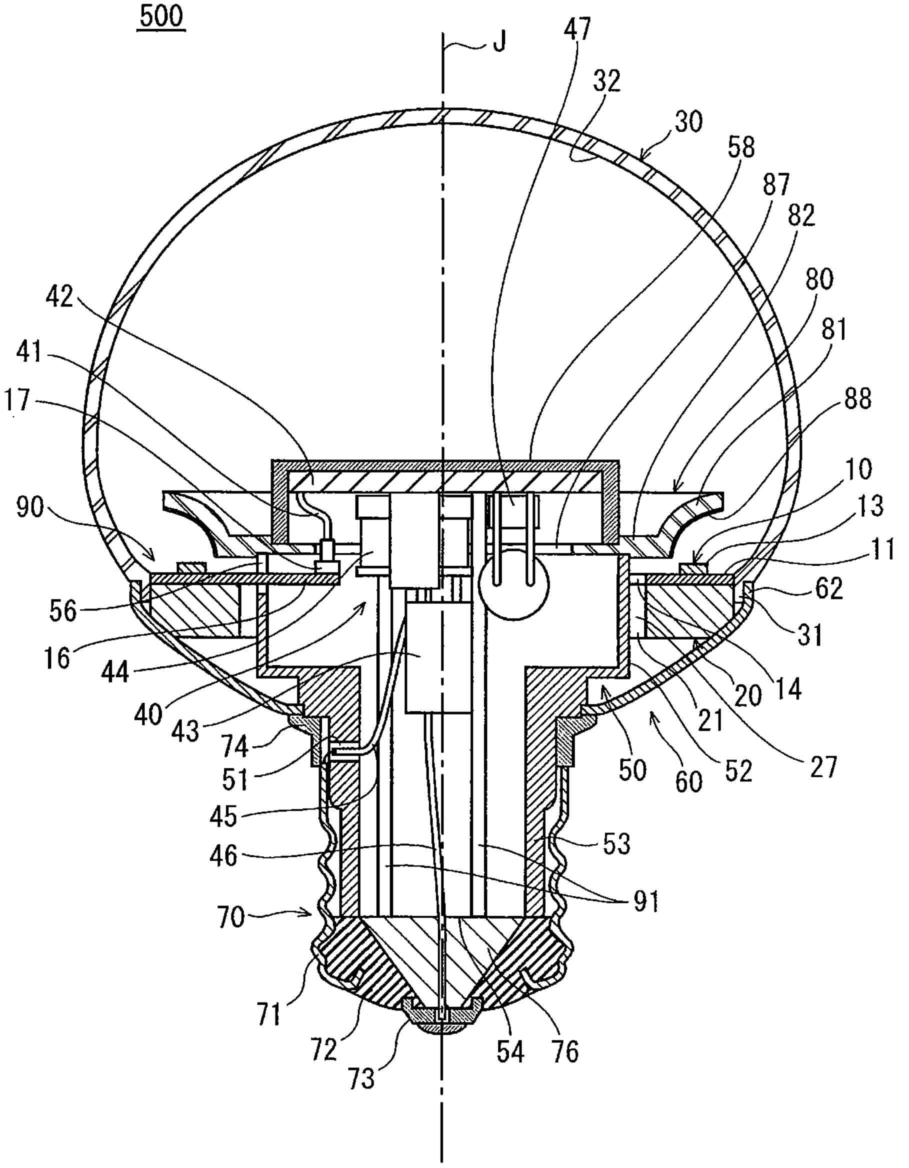
FIG. 10 is a cross-sectional diagram illustrating the overall configuration of a lamp light source pertaining to a fourth variation.

(4) In Embodiment 1 as described above, the heat produced by the circuit unit 40 is transmitted from the circuit substrate 42 through the circuit holder 50 and the beam splitter 80 to the base 70. As such, the temperature of the circuit holder 50 and the space within increases, potentially leading to an increase in the heat load imposed on the circuit unit 40 contained in the circuit holder 50. However, as shown in FIG. 10, the configuration of Embodiment 1 may be supplemented by providing support members 91. These allow the heat produced by the circuit unit 40 to be transferred to the base 70.

According to this variation, the heat produced by the circuit unit 40 is transferred in part as described in Embodiment 1, i.e., through the circuit holder 50 and the beam splitter 80 to the base 70, while another part of the heat is instead transferred through the highly thermoconductive support members 91 to the base 70. Therefore, temperature increases in the circuit holder 50 and in the space within are suppressed. This effectively prevents the heat load imposed on the circuit unit 40 from increasing.

In such circumstances, the gap 27 is still provided between the circuit holder 50 and the light-emitting unit 90. Thus, the transmission of heat from the light-emitting unit 90 to the circuit holder 50 is suppressed and the heat load on the circuit unit 40 is prevented from increasing.

(5) A further heat transmission pathway may be provided between the base 70 and electronic component 47, which is the electronic component producing the most heat among those making up the circuit unit 40, so as to transmit the heat produced by electronic component 47 directly to the base 70. The electronic component 47 producing the most heat is, for example, a switching element or a transistor.

Figure 11:
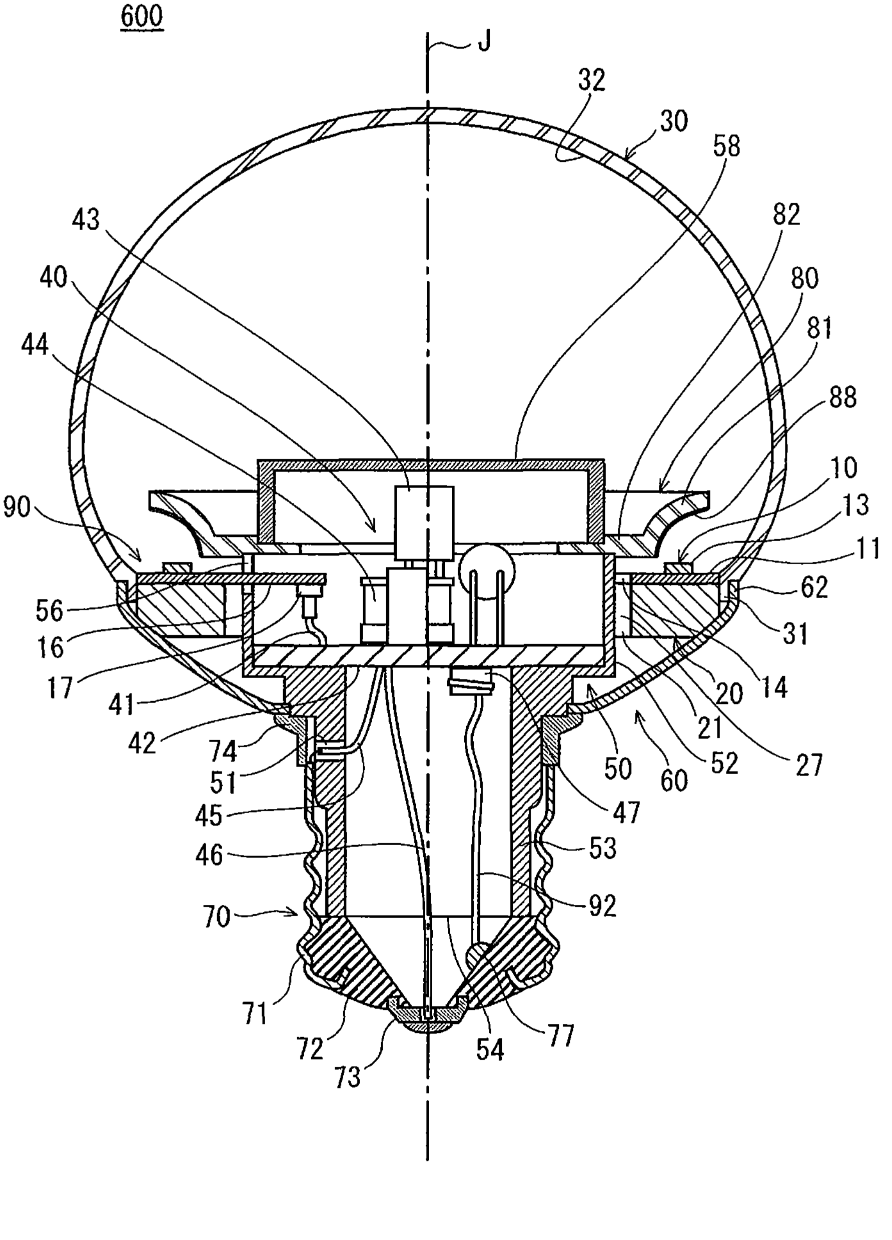
FIG. 11 is a cross-sectional diagram illustrating the overall configuration of a lamp light source pertaining to a fifth variation.

For example, as shown in in FIG. 11, a rope-like heat conducting member 92 may be fixed to the electronic component 47 at one end, while the other end thereof is fixed to the insulating member 72 of the base 70 using resin or a similar adhesive 77. Accordingly, most of the large amount of heat produced by electronic component 47 is transmitted through the heat conducting member 92 to the base 70. This enables suppression of heat transmission from electronic component 47 to the circuit substrate 42 and, as described in the fourth variation above, temperature increases in the circuit holder 50 and in the space within are suppressed. This effectively prevents the heat load imposed on the circuit unit 40 from increasing.

In such circumstances, gap 27 is still provided between the circuit holder 50 and the light-emitting unit 90. Thus, the transmission of heat from the light-emitting unit 90 to the circuit holder 50 is suppressed and the heat load on the circuit unit 40 is prevented from increasing.

Figure 12:
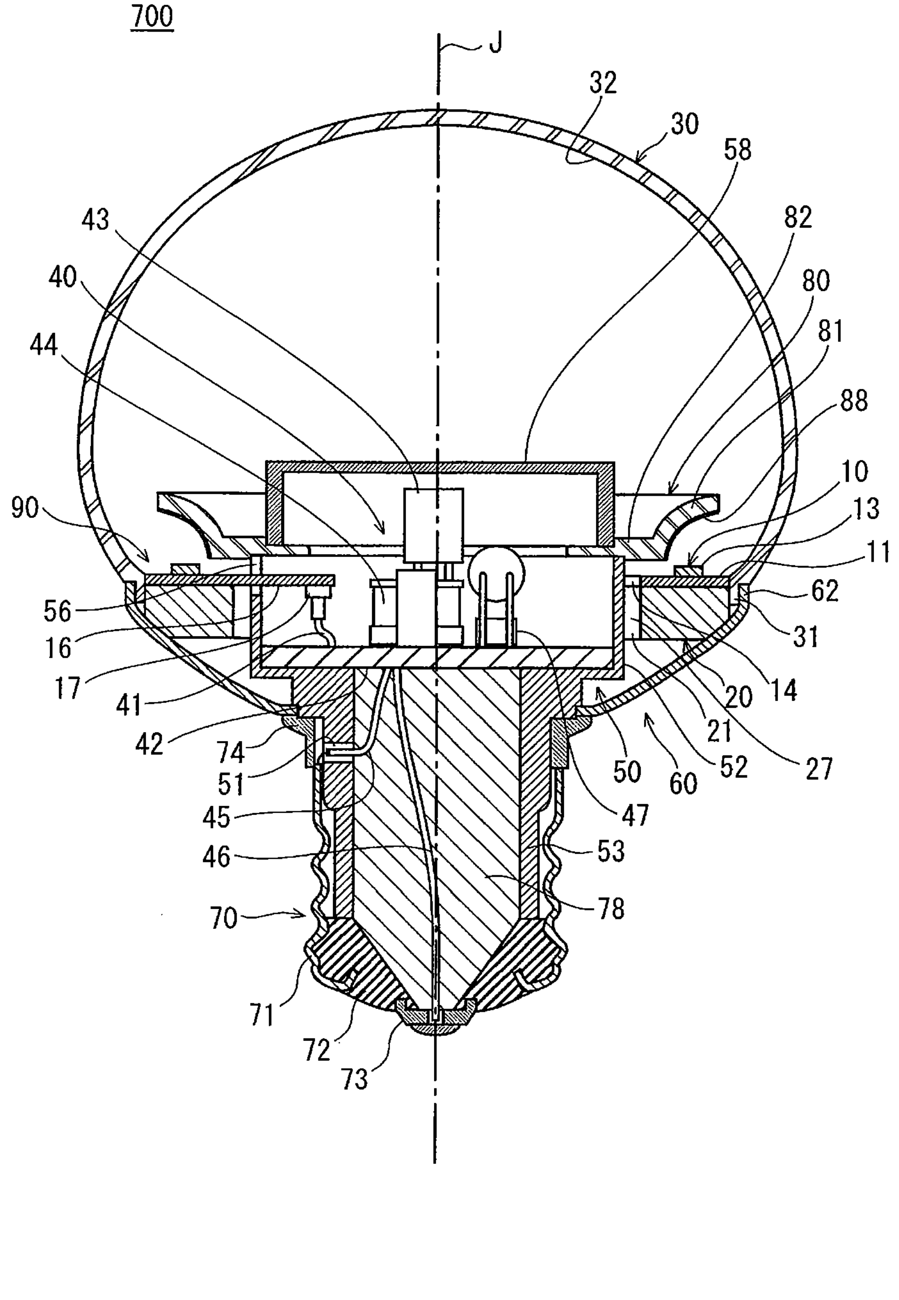
FIG. 12 is a cross-sectional diagram illustrating the overall configuration of a lamp light source pertaining to a sixth variation.

(6) As shown in FIG. 12, the support members 91 of the fourth variation and the heat conducting member 92 of the fifth variation may be replaced by an insulating thermoconductive filling member 78, which is made of resin or the like, solidly fills the space between the circuit unit 40 and the base 70, and is thermally conductive.

In such circumstances, in order to prevent damage to the electronic components of the circuit unit 40 during the filling and hardening of the insulating thermoconductive filling member 78, the insulating thermoconductive filling member 78 solidly fills a space defined by the back face of the circuit substrate 42, the inner face of the small-diameter portion 53, the inner face of the insulating member 72, and the eyelet portion 73, formed when, as shown, the circuit substrate 42 is fixed to the bottom face of the large-diameter portion 52 and to the front end of the small-diameter portion 53 and the electronic components are arranged on the front face of the circuit substrate 42.

In this variation, gap 27 is still provided between the circuit holder 50 and the light-emitting unit 90. Thus, the transmission of heat from the light-emitting unit 90 to the circuit holder 50 is suppressed, heat produced by the circuit unit 40 is transmitted through the insulating thermoconductive filling member 78 to the base 70, and the heat load on the circuit unit 40 is prevented from increasing.

Figure 13:
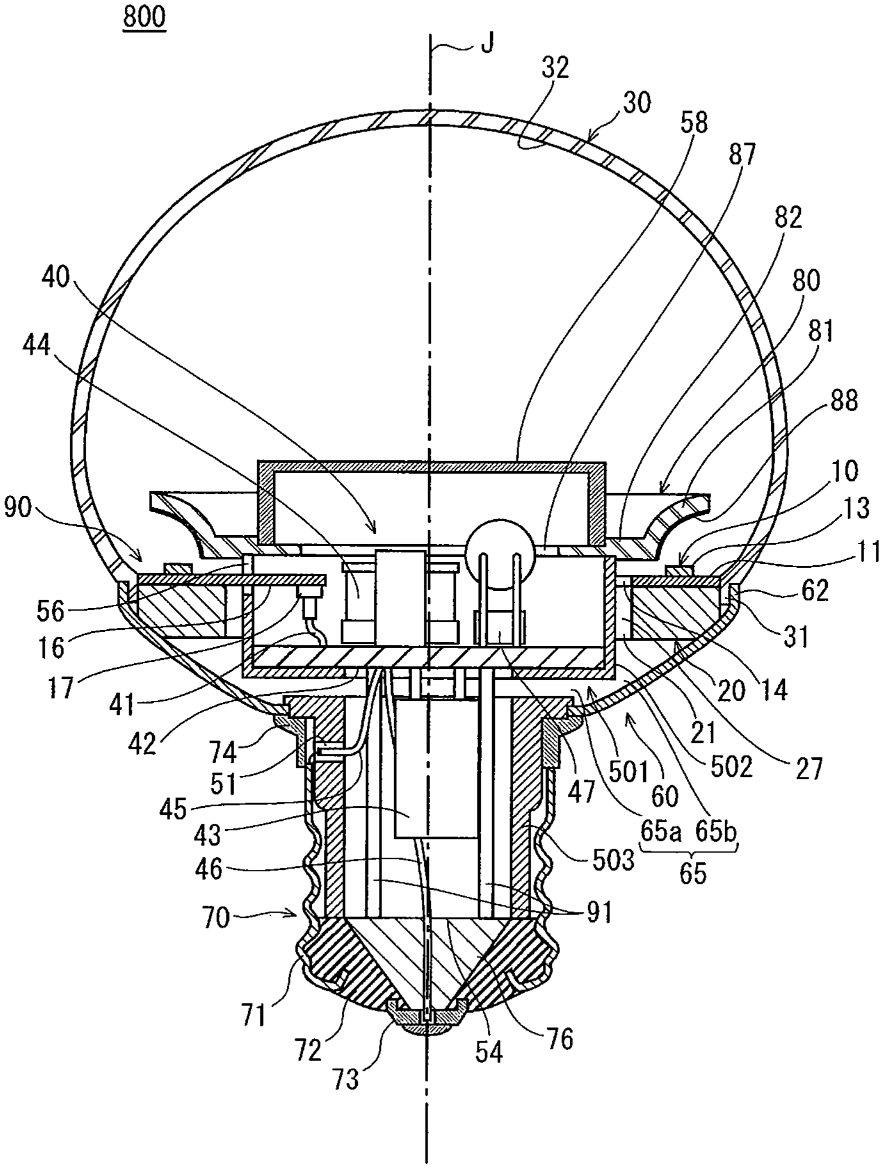
FIG. 13 is a cross-sectional diagram illustrating the overall configuration of a lamp light source pertaining to a seventh variation.

(7) Embodiment 2 describes circuit substrate 42 as fixed to the lid 58. However, as shown in FIG. 13, the circuit substrate 42 may also be fixed to the bottom face of the large-diameter portion 502.

In such circumstances, gap 27 is still provided between the circuit holder 50 and the light-emitting unit 90. Thus, the transmission of heat from the light-emitting unit 90 to the circuit holder 50 is suppressed, and the heat produced by the circuit unit 40 is transmitted through the support members 91 to the base 70. Also, the space in the circuit holder main body and the tubular portion 503 and space 33 in the globe 30 are in communication via gap 65, space 61, and gap 27, thus encouraging air circulation. Thus, high local temperatures are prevented from arising in the space within the circuit holder main body and the tubular portion 503, and an effective constraint is placed on the heat load imposed on the circuit unit 40.

Furthermore, heat-sensitive electronic component 43 may be arranged on the back face of the circuit substrate 42, i.e., on the principal surface thereof farther from the semiconductor light-emitting module 10. This constrains the effect of the heat produced by the semiconductor light-emitting module 10 on electronic component 43.

Figure 14:
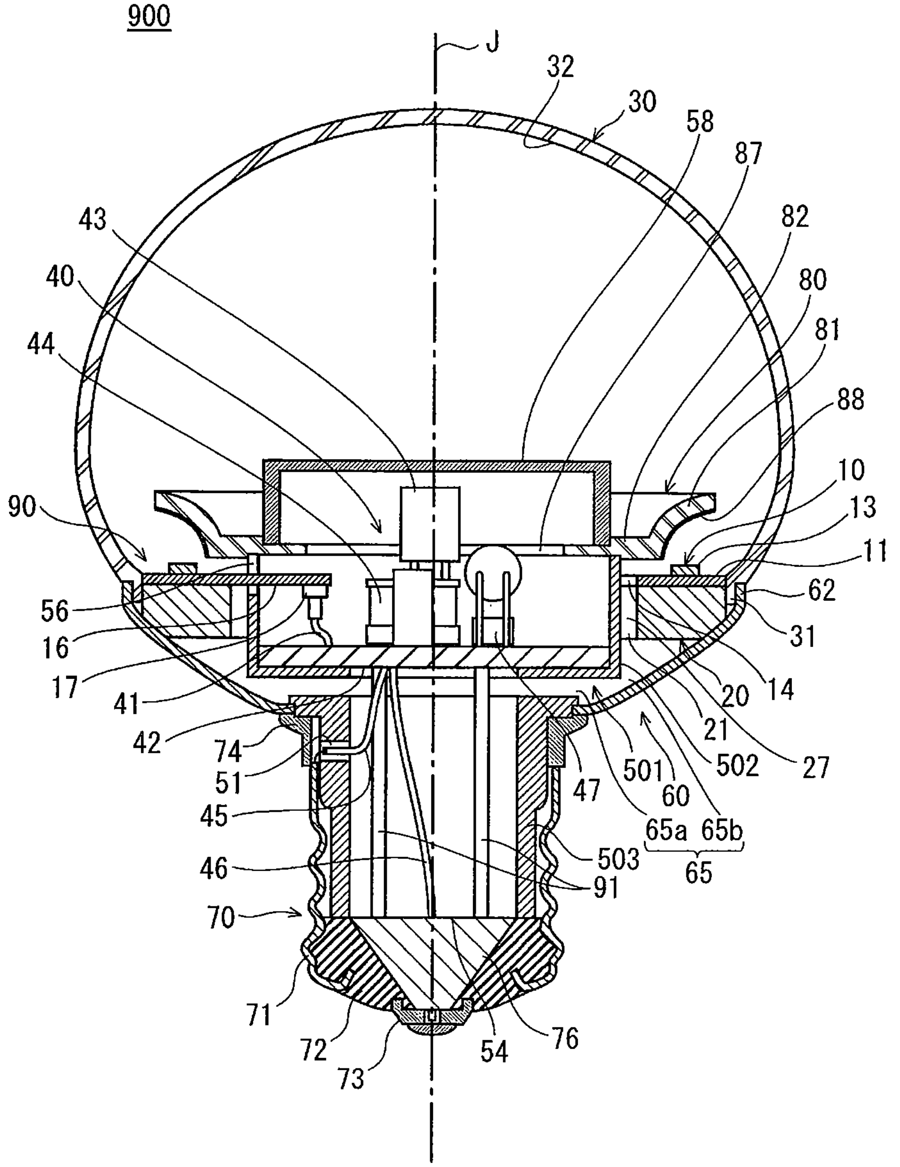
FIG. 14 is a cross-sectional diagram illustrating the overall configuration of a lamp light source pertaining to an eighth variation.

(8) When, for example, in the seventh variation described above, the base 70 has a small diameter and the small-diameter portion 53 is not easily able to accommodate electronic component 43, then as shown in FIG. 14, electronic component 43 may be arranged on the front face of the circuit substrate 42 along with the other electronic components, i.e., arranged on the side closer to the semiconductor light-emitting module 70.

In such circumstances, gap 27 is still provided between the circuit holder 50 and the light-emitting unit 90. Thus, the transmission of heat from the light-emitting unit 90 to the circuit holder 50 is suppressed, and the heat produced by the circuit unit 40 is transmitted through the support members 91 to the base 70. Also, the space in the circuit holder main body and the tubular portion 503 and space 33 in the globe 30 are in communication via gap 65, space 61, and gap 27, thus encouraging air circulation. Thus, high local temperatures are prevented from arising in the space within the circuit holder main body and the tubular portion 503, and an effective constraint is placed on the heat load imposed on the circuit unit 40.

Also, electronic component 43 may be arranged so as to be contained within the lid 58. As such, electronic component 43 is arranged as far away as possible from the semiconductor light-emitting module 10, suppressing the effect of heat produced by the semiconductor light-emitting module 10 thereon.

Figure 15:
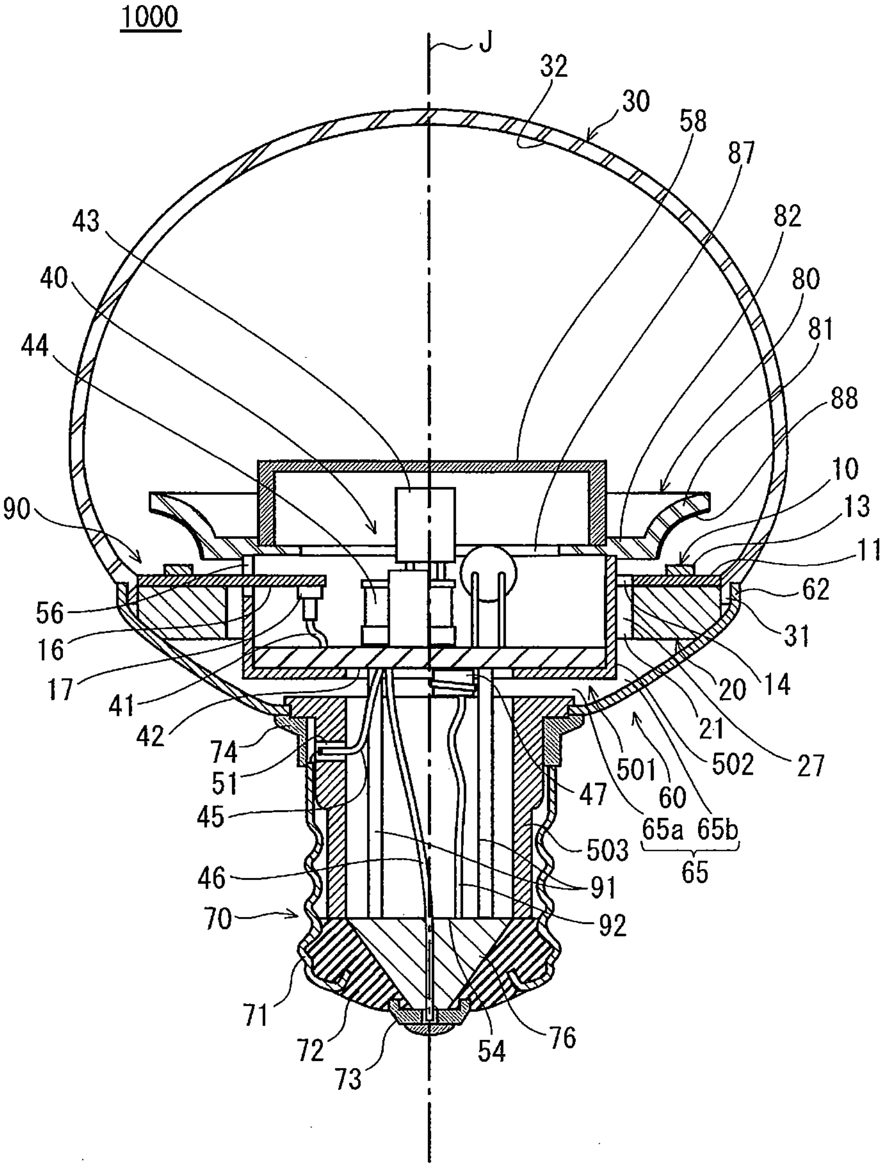
FIG. 15 is a cross-sectional diagram illustrating the overall configuration of a lamp light source pertaining to a ninth variation.

(9) In Embodiment 2, the circuit unit 40 is supported in relation to the base 70 by support members 91, which form a heat transmission pathway from the circuit unit 40 to the base 70 and transmit the heat produced by the circuit unit 40 to the base 70 to be dissipated. However, as shown in FIG. 15 and as described in the fifth variation, a further heat transmission pathway may be provided between the base 70 and electronic component 47, which is the electronic component producing the most heat among those making up the circuit unit 40, so as to transmit the heat produced by electronic component 47 directly to the base 70.

In such circumstances, gap 27 is still provided between the circuit holder 50 and the light-emitting unit 90. Thus, the transmission of heat from the light-emitting unit 90 to the circuit holder 50 is suppressed, and the heat produced by the circuit unit 40 is transmitted through the support members 91 to the base 70. Also, the space in the circuit holder main body and the tubular portion 503 and space 33 in the globe 30 are in communication via gap 65, space 61, and gap 27, thus encouraging air circulation. Thus, high local temperatures are prevented from arising in the space within the circuit holder main body and the tubular portion 503, and an effective constraint is placed on the heat load imposed on the circuit unit 40.

Accordingly, by providing the heat conducting member 92, most of the large amount of heat produced by electronic component 47 is transmitted through the heat conducting member 92 to the base 70. This enables suppression of heat transmission from electronic component 47 to the circuit substrate 42 and, as described in the eighth variation above, temperature increases in the circuit holder 50 and in the space within are suppressed. This effectively prevents the heat load imposed on the circuit unit 40 from increasing.

(10) In the Embodiments and variations described above, the beam splitter 80 is sandwiched between the large-diameter portion 52 (502) of the circuit holder 50 (501) and the lid 58. However, no limitation is intended. For example, as shown in FIG. 16, a beam splitter 180 may be fixed by an adhesive not to a circuit holder 150 but rather to a mounting substrate 111 of a semiconductor light-emitting module 110.

Accordingly, the heat received by a light-receiving surface (outer circumferential surface) 188 of the beam splitter 180 from the semiconductor light-emitting module 110 is not transmitted to the circuit holder 150. Thus, the heat load imposed on the circuit unit 40 is suppressed.

Figure 16:
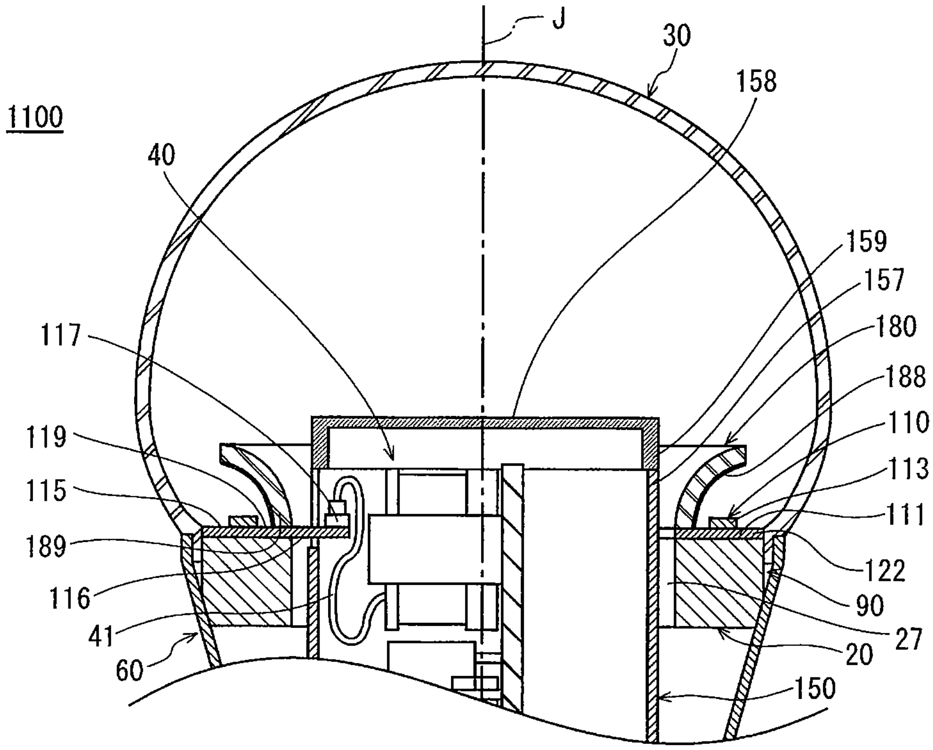
FIG. 16 is a cross-sectional diagram illustrating the overall configuration of a lamp light source pertaining to a tenth variation.

Also, FIG. 16 illustrates a variation in which the configuration of the beam splitter 180 is applied to the third variation as illustrated by FIG. 9, when appropriate.

Figure 17:
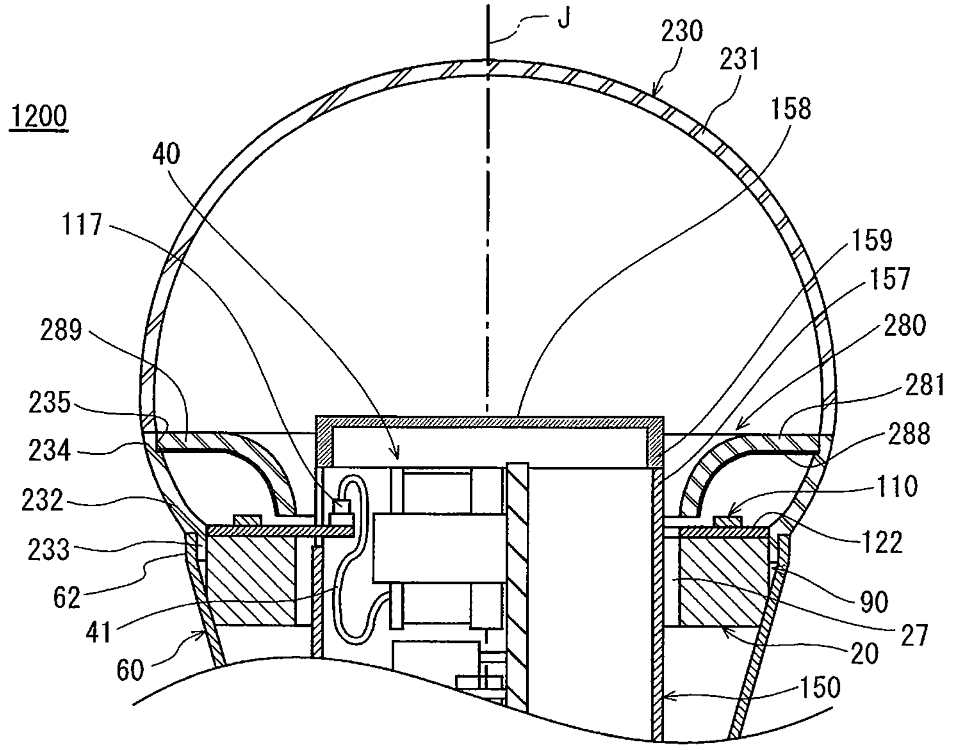
FIG. 17 is a cross-sectional diagram illustrating the overall configuration of a lamp light source pertaining to an eleventh variation.

(11) Further still, as shown in FIG. 17, a beam splitter 280 may be fixed to a globe 230 rather than to the mounting substrate 111.

Also, FIG. 17 illustrates a variation in which the configuration of the beam splitter 280 is applied to the third variation as illustrated by FIG. 9, when appropriate.

The globe 230 is made up of a front member 231 and a rear member 232, divided along a virtual plane that is orthogonal to lamp axis J and divides the globe 230. The front member 231 and the rear member 232 are combined to form a lamp light source shaped so as to resemble a typical Japanese type A light bulb. A rear edge portion 233 of the rear member 232 is accommodated in the forward edge portion 62 of the case 60. The case 60, the mount 20, and the rear member 232 are fixed so as to form a single whole by introducing adhesive or similar. The front end of the rear member 232 is attached to the front member 231.

The beam splitter 280 is, for example, shaped like the beam splitter 80 pertaining to Embodiment 1 but modified so as to be substantially tubular, with the forward edge portion of the main body 81 extending away from lamp axis J, and as described in Embodiment 2, is not fixed to the mounting substrate 111 but rather has a forward edge portion 289 fixed to the rear member 232 of the globe 230. Specifically, an engagement groove 235 is provided in the forward edge portion 234 of the rear member 232 for engaging with the forward edge portion 289 of the main body 281. The engagement groove engages with the forward edge portion 289 to achieve fixing. When the forward edge portion 289 is engaged with the engagement groove 235, adhesive or similar may be used to form an adhesive bond between a forward edge portion 234 and another forward edge portion 289. The globe 230 also has an inner face that diffuses the light emitted by the semiconductor light-emitting module 10. For example, the inner face may be treated with silica or with a white pigment so as to achieve light diffusion.

According to this variation as described above, the beam splitter 280 is not in contact with the semiconductor light-emitting module 110 or with the circuit holder 150. Accordingly, the heat produced by the semiconductor light-emitting module 110 is unlikely to be transmitted to the beam splitter 280 and even less likely to be transmitted through the beam splitter 280 to the circuit holder 150. Thus, the heat load imposed on the circuit unit 40 is effectively suppressed.

(12) In the above-described Embodiments and variations, the semiconductor light-emitting elements 12 are arranged in pairs, each sealed by a substantially rectangular sealer 13, the longitudinal direction of each sealer 13 coincides with a radial direction of the element mounting portion 15, and the sealers appear to be radiating from the central lamp axis J when viewed from the front along lamp axis J. However, no limitation is intended.

Figure 18A:
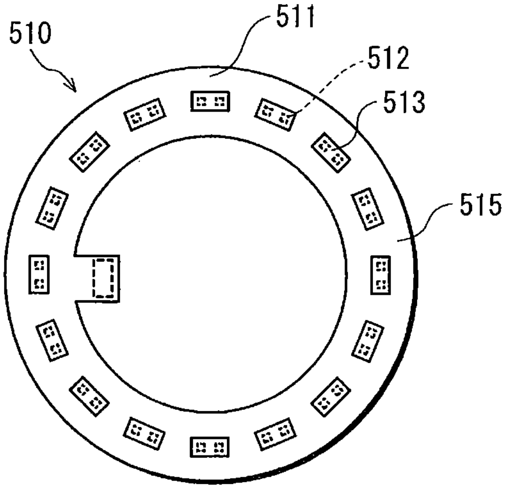
FIG. 18A is a plane view of a semiconductor light-emitting module pertaining to a twelfth variation.

For example, as indicated by a semiconductor light-emitting module 510 shown in FIG. 18A, sealers 513 may also be oriented on an element mounting portion 515 of a mounting substrate 511 such that the longitudinal direction of the sealers 513 is aligned with the circumferential direction of the element mounting portion 515. A plurality of semiconductor light-emitting elements 512 are arranged on the element mounting portion 515 of the mounting substrate 511 and aligned the circumferential direction of the element mounting portion 515, the sealers 513 each seal one pair of the semiconductor light-emitting elements 512, and the longitudinal direction of the sealers 513 is aligned with the circumferential direction of the element mounting portion 515. Accordingly, the light-emitting portion is made nearly continuous along the circumferential direction of the element mounting portion 515, thus making illumination intensity in the circumferential direction irregularities unlikely.

Figure 18B:
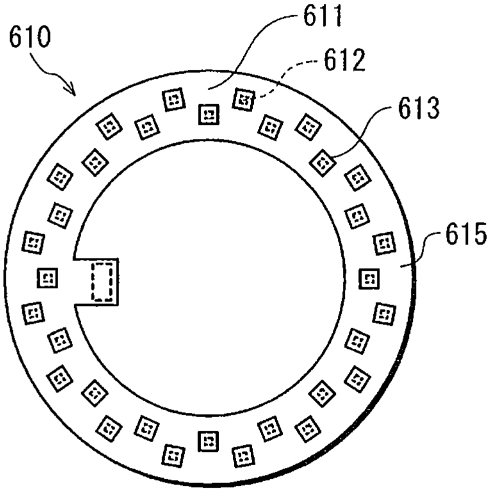
FIG. 18B is a plane view of a semiconductor light-emitting module pertaining to a thirteenth variation.

(13) Also, as indicated by semiconductor light-emitting module 610 shown in FIG. 18B, a plurality of semiconductor light-emitting elements 612 may be arranged in a staggered pattern along the circumferential direction of an element mounting portion 615 of a mounting substrate 611. The semiconductor light-emitting elements 612 are, for example, individually sealed by sealers 613. Accordingly, a more even light-emitting portion can be realized over the element mounting portion, thus improving the light distribution characteristics.

Figure 18C:
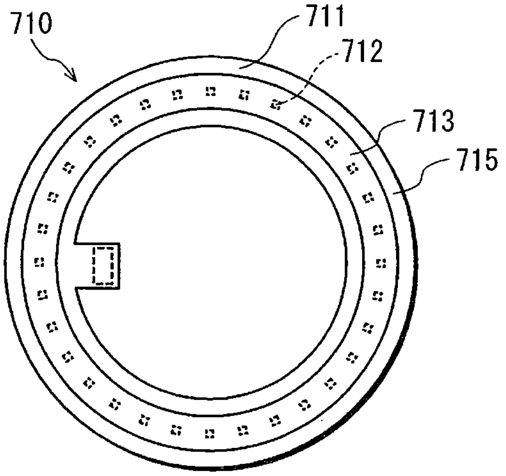
FIG. 18C is a plane view of a semiconductor light-emitting module pertaining to a fourteenth variation.

(14) Further, as indicated by semiconductor light-emitting module 710 shown in FIG. 18C, a plurality of semiconductor light-emitting elements 712 may be aligned along the circumferential direction of an element mounting portion 715 of a mounting substrate 711, and all of the semiconductor light-emitting elements 712 may be sealed by a single substantially annular sealer 713. Accordingly, the light-emitting portion can be made continuous with the element mounting portion 715, thus making illumination intensity irregularities in the circumferential direction unlikely.

Figure 18D:
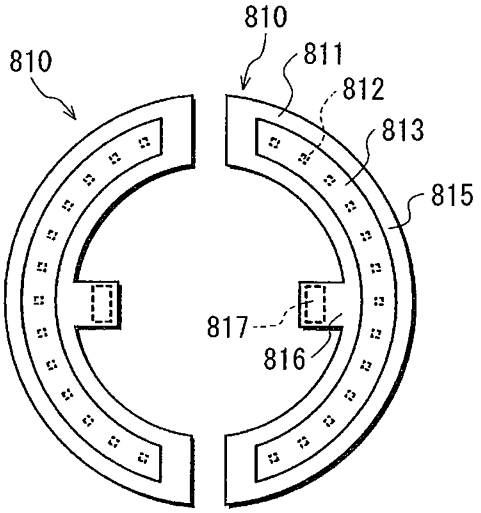
FIG. 18D is a plane view of a semiconductor light-emitting module pertaining to a fifteenth variation.

(15) Also, as indicated by semiconductor light-emitting module 810 shown in FIG. 18D, a plurality of pieces may be mounted in combination on the mount 20. For example, a mounting substrate 811 may be made of a substantially semicircular element mounting portion 815 and a tongue portion 816 extending from one part of the element mounting portion 815. A plurality of semiconductor light-emitting elements 812 may be mounted in an arc pattern on the element mounting portion 815 and sealed by a single substantially semicircular sealer 813. A connector 817 is provided on the tongue portion 816. Assembly is not complexified, provided that each module is arranged so that the front face 22 of the mount 20 is mountable on the semiconductor light-emitting modules 810, i.e., so to be planar.

Figure 19:
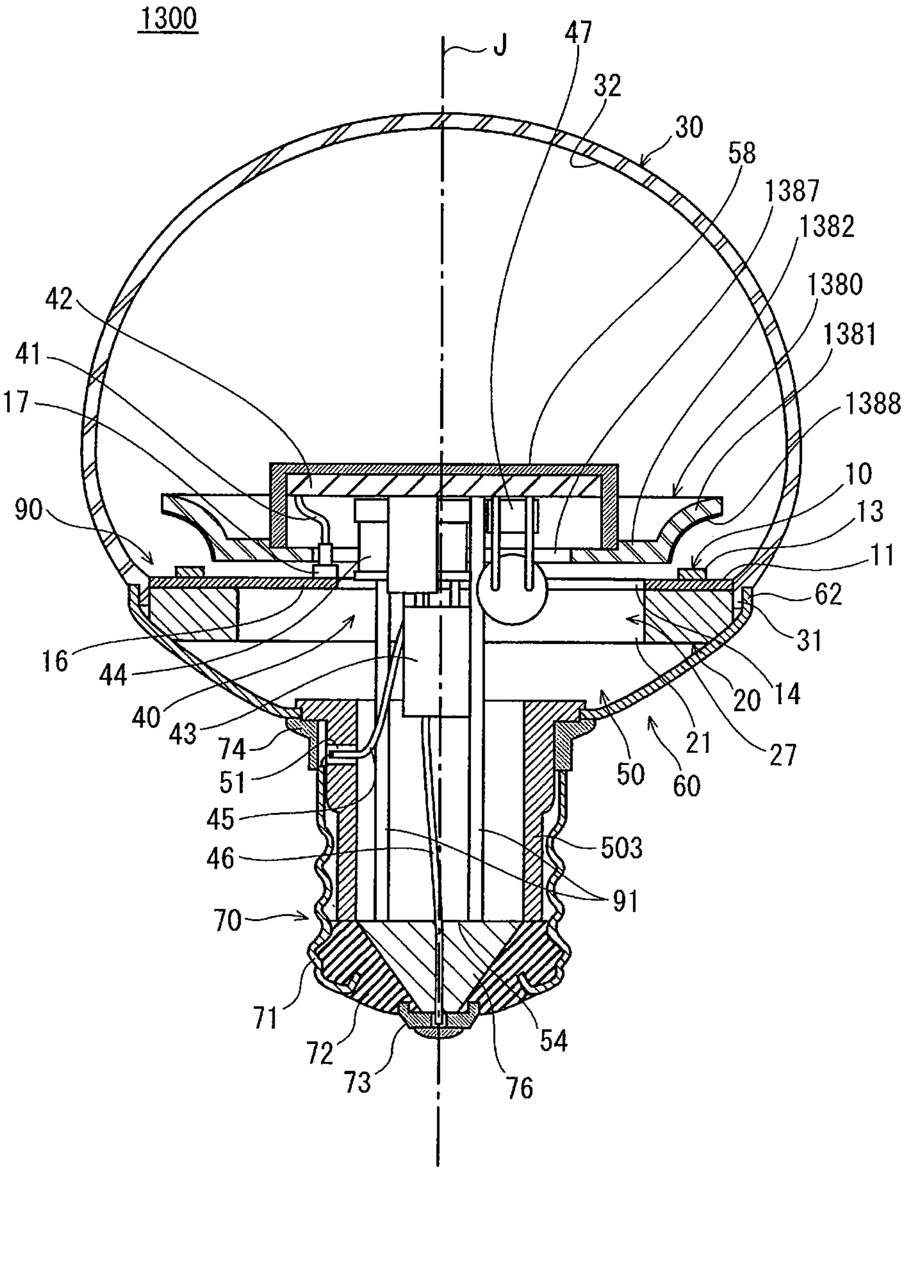
FIG. 19 is a cross-sectional diagram illustrating the overall configuration of a lamp light source pertaining to a sixteenth variation.

(16) Alternatively, the circuit holder may be omitted in whole or in part from the configuration, provided that sufficient space is provided between the circuit unit 40 and the light-emitting unit 90, the case 60, and so on, and that insulation is maintained for the circuit unit 40. For example, as indicated by lamp light source 1300 shown in FIG. 19, the circuit holder main body is not required. As shown, the circuit unit 40 is indirectly supported in relation to the base 70 through the support member 91 and via the support base 76. Also, a beam splitter 1380 is fixed to the lid 58 by adhesive or similar.

Figure 20:
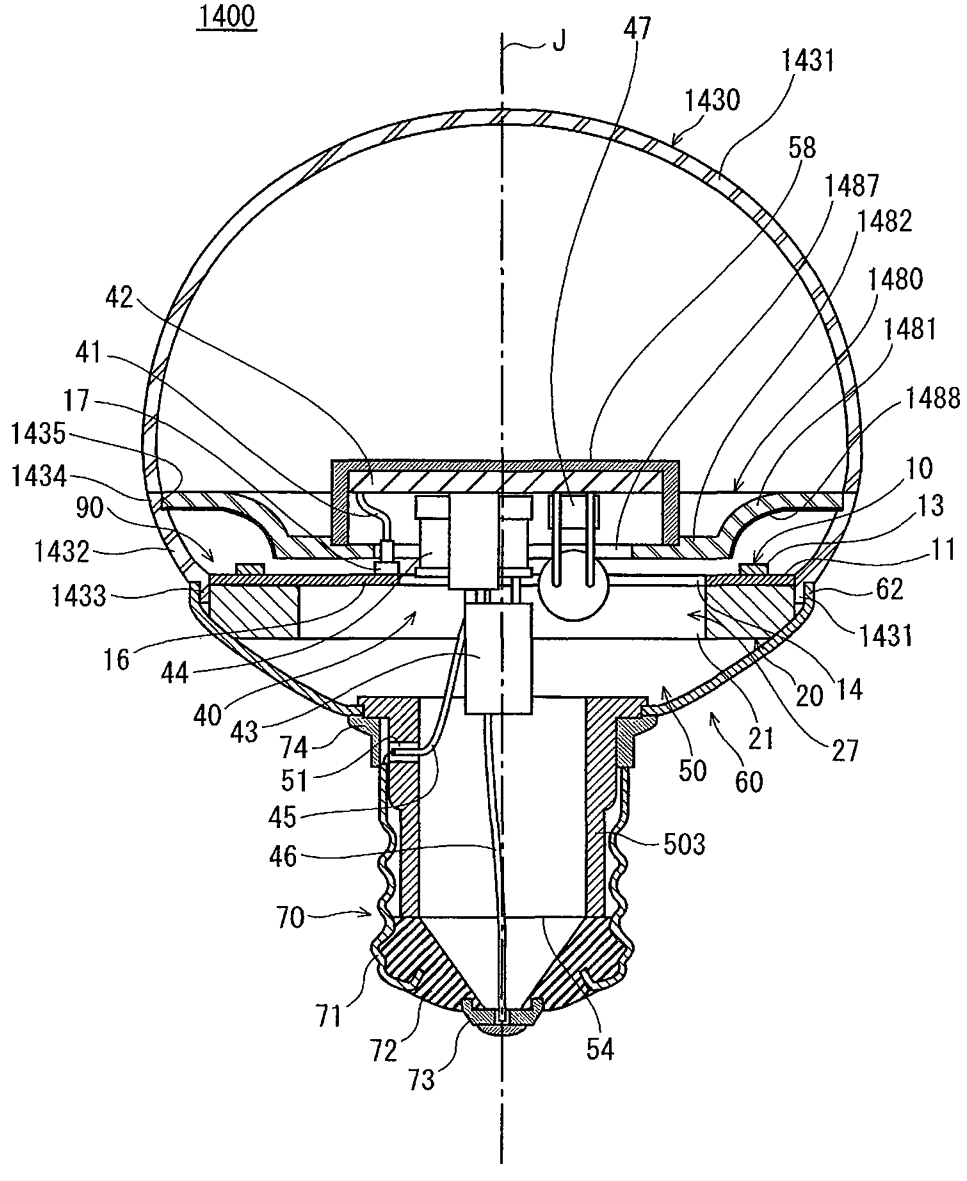
FIG. 20 is a cross-sectional diagram illustrating the overall configuration of a lamp light source pertaining to a seventeenth variation.

(17) In addition, as illustrated by lamp light source 1400 shown in FIG. 20, the circuit unit 40 may also be configured so as to be supported by a beam splitter 1480 in relation to a globe 1430. As shown, the circuit substrate 42 of the circuit unit 40 is fixed to the lid 58 by adhesive or similar, and the lid 58 is likewise fixed to the beam splitter 1480. Then, the beam splitter 1480 is fixed to the globe 1430, and the circuit unit 40 is thus supported in relation to the globe 1430. In such circumstances, the lid 58 and the beam splitter 1480 serve the role of support members that support the circuit unit in relation to the envelope (made up of the globe 1430, the case 60, and the base 70).

Figure 21:
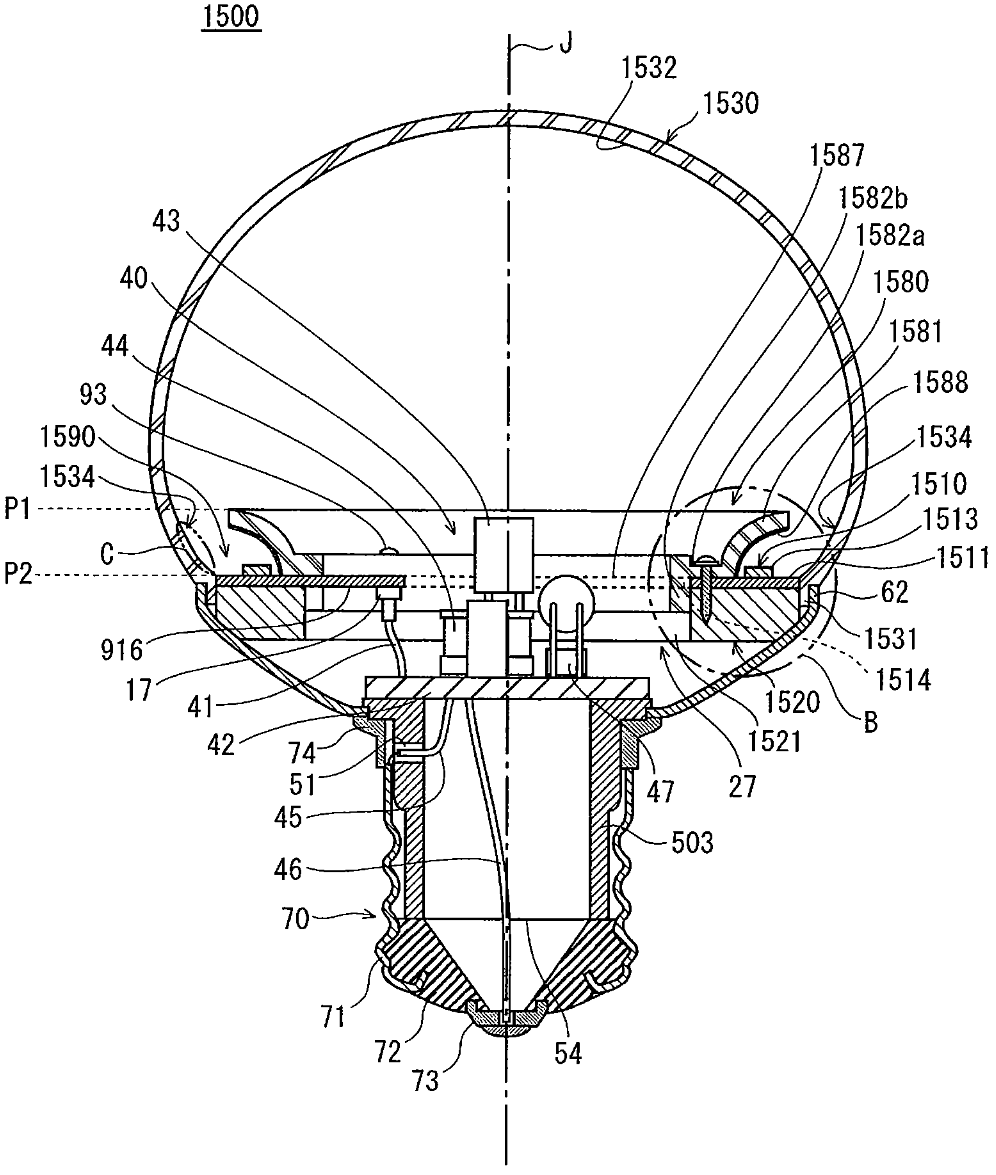
FIG. 21 is a cross-sectional diagram illustrating the overall configuration of a lamp light source pertaining to an eighteenth variation.

(18) Further, as indicated by lamp light source 1500 shown in FIG. 21, the circuit substrate 42 is fixed to the tubular portion 503, and thus supported in relation to the base 70. In such circumstances, as shown, the lid may be omitted. Also, the tubular portion 503 may be considered a portion of the base 70, and the circuit holder may be completely absent.

(19) Although the above Embodiments and variations (those shown in FIGS. 16 and 21 excepted) describe the beam splitter as being separate from the light-emitting unit, no limitation is intended. As indicated by lamp light source 1500 shown in FIG. 21, a space may be provided between the beam splitter 1580 and the circuit unit 40 such that the two components are separated. Thus, there is no risk of transmitting the heat produced by the light-emitting unit 1590 through the beam splitter 1580 to the circuit unit 40. Like the lamp light source 1100 of the tenth variation illustrated in FIG. 16, the beam splitter 1580 is fixed directly to the top face of the mounting substrate 1511 of the semiconductor light-emitting module 1510.

The beam splitter 1580 may be fixed to the top face of the mounting substrate 1511 the using an adhesive or the like, or the beam splitter 1580 and the mounting substrate 1511 may be fixed by screws 93 to form a single whole with the mount 1520.

Figure 22:
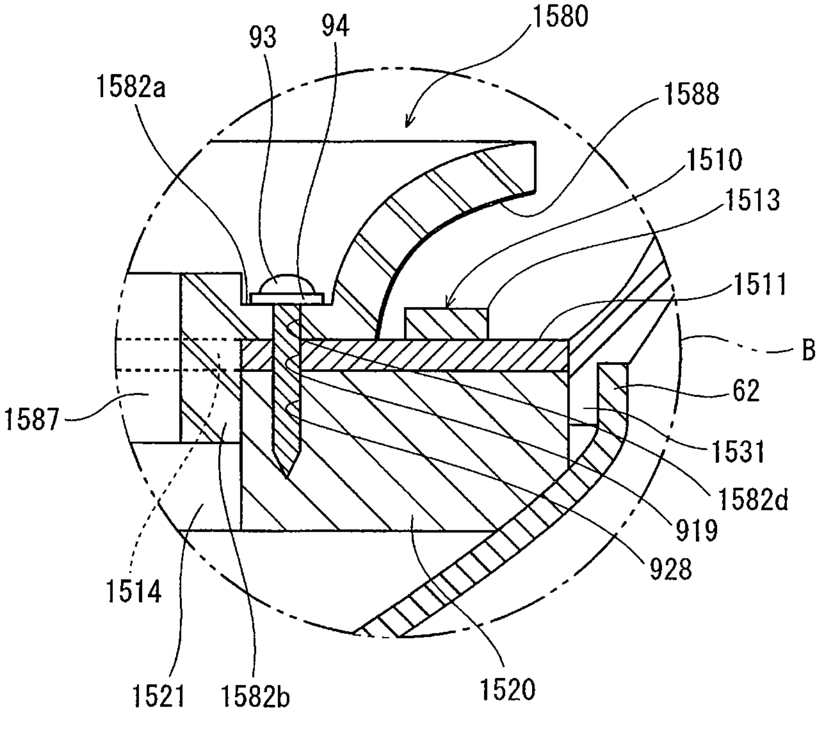
FIG. 22 is a magnified view of portion B in FIG. 21.

FIG. 22 is a magnified view of the portion of FIG. 21 surrounded by double-chained line circle B, showing the above-described beam splitter 1580 and the mounting substrate 1511 fixed to the mount 1520 by the screws 93. As shown, screw hole 928 is provided in the mount 1520, screw hole 919, which is a through-hole, is provided in the mounting substrate 1511, and screw hole 1582*d*, which is also a through-hole, is provided in the beam splitter 1580. The screws 93 are screwed into these screw holes through a washer 94. Accordingly, the mounting substrate 1511 and the beam splitter 1580 are fixed to the mount 1520. The front face of the portion of the beam splitter 1580 where the screws 93 are screwed is formed as a recess 1582*a*, simplifying the introduction of the screws 93. A hole 1587, which is a through-hole, is provided at the centre of the beam splitter 1580. The portion between the inner face of the hole 1514 and screw hole 1582*d* is formed so as to protrude along the inner face toward the back face, forming a positioning portion 1582*b*. The external diameter of the positioning portion 1582*b* matches the internal diameter of through-hole 1521 in the mount 1520 and hole 1514 in the mounting substrate 1511. The positioning portion 1582*b* is fit into through-hole 1521 in the mount 1520 and hole 1514 in the mounting substrate 1511 such that the positions of the screw holes 928, 919, and 1582*d* coincide when viewed head-on (i.e., in a direction parallel to lamp axis J). Thus, the screws 93 are screwable, simplifying the assembly.

In addition, a piece of the positioning portion 1582*b* is cut away to allow the tongue portion 916 to fit in this cutaway potion.

Although FIG. 21 illustrates the beam splitter 1580 and the mounting substrate 1511 as being fixed to the mount 1520 by screws at three positions, no limitation is intended. Two screw positions may be used, as may four or more screw positions.

(20) In the above-described Embodiments and variations, the inner face of the globe is treated so as to diffuse the light emitted by the semiconductor light-emitting module. For example, the inner face may be treated with silica or with a white pigment so as to achieve light diffusion. However, the inner face of the globe in the vicinity of the opening thereof may also be provided with a treated portion (light-diffusing portion) 1534 in a region illuminated by the portion of light emitted from the semiconductor light-emitting module and reflected by the beam splitter so as to further enhance the diffusing effect.

As shown in FIG. 21, the region of the inner face of the globe 1530 illuminated by the portion of light emitted from the semiconductor light-emitting module 1510 and reflected by the outer circumferential surface 1588 of the beam splitter 1580 is in near correspondence with a region between virtual plane P1, which is orthogonal to lamp axis J and passes through the forward edge portion of the beam splitter 1580, and virtual plane P2, which corresponds to the front face of the mounting substrate 1511. In the figure, the virtual planes P1 and P2 are cross-sections of planes passing through lamp axis J, represented by dashed lines.

Figure 23:
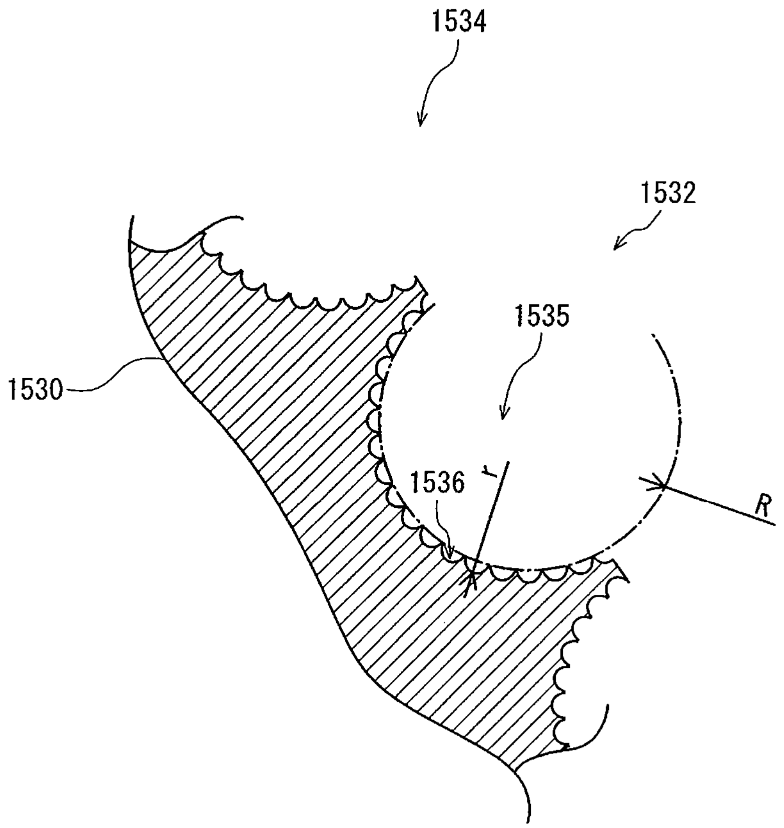
FIG. 23 is a magnified view of portion C in FIG. 21.

FIG. 23 is a cross-sectional diagram showing a magnified view of section C, encircled by the chained line in FIG. 21. FIG. 23 does not illustrate the entirety of the section encompassed by the oval section C. Only a small sub-section is illustrated. The treated portion 1534 of the inner face 1532 of the globe 1530 is formed as a uniform series of primary dimples 1535, each being a semisphere of radius R (where R=40 μm, for example). A uniform series of secondary dimples 1536 are formed on the inner face of each primary dimple 1535, each secondary dimple 1536 being a semi-sphere of radius r (where r=5 μm, for example).

Accordingly, each tiny dimple so formed has a uniform series of yet smaller simples formed therein. This doubly-dimpled structure provides the treated portion 1534 with improved light dispersion characteristics in comparison to similar but singly-dimpled structures.

The treated portion 1534 is formed in a region of the globe 1530 that is exposed from the case 60, a region where the light reflected by the outer circumferential surface 1588 of the beam splitter 1580 arrives being beneficial. This results in the light reflected backward by the outer circumferential surface 1588 being diffused by the (treated portion 1534 of the) globe 1530, expanding the light dispersion range backward, and improving the contrast provided by the globe 1530 when the lamp light source 1500 is lit.

The radius of each primary dimple 1535 is desirably such that R=20 μm to 40 μm, inclusive, and the radius of each secondary dimple 1536 is desirably such that r=2 μm to 9 μm, inclusive.

Also, the semiconductor light-emitting elements 12 need not necessarily be arranged so as to emit light forward, i.e., along lamp axis J. The semiconductor light-emitting elements 12 may be, in whole or in part, arranged so as to be slanted with respect to lamp axis J. Accordingly, control of the light distribution is improved and desired light distribution is achievable.

(21) The support members 91 used in FIG. 14 may be replaced by an insulating thermoconductive filling member 78, which is made of resin or the like, solidly fills the space between the large-diameter portion 502 and the base 70, and is thermally conductive. Such a member is shown in FIG. 12 and described in the sixth variation.

In such circumstances, gap 65*a* between the large-diameter portion 502 and the tubular portion 503 is filled by the insulating thermoconductive filling member 78 and eliminated thereby. Gap 65*b* between the large-diameter portion 502 and the case 60 is likewise partly filled by the insulating thermoconductive filling member 78 and thereby eliminated. However, the space within the tubular portion 503 is also filled by the insulating thermoconductive filling member 78. Thus, the heat produced by the circuit unit 40 is transmitted through the insulating thermoconductive filling member 78 to the base 70 to be dissipated thereby, thus constraining heat accumulation in the space.

Figure 24:
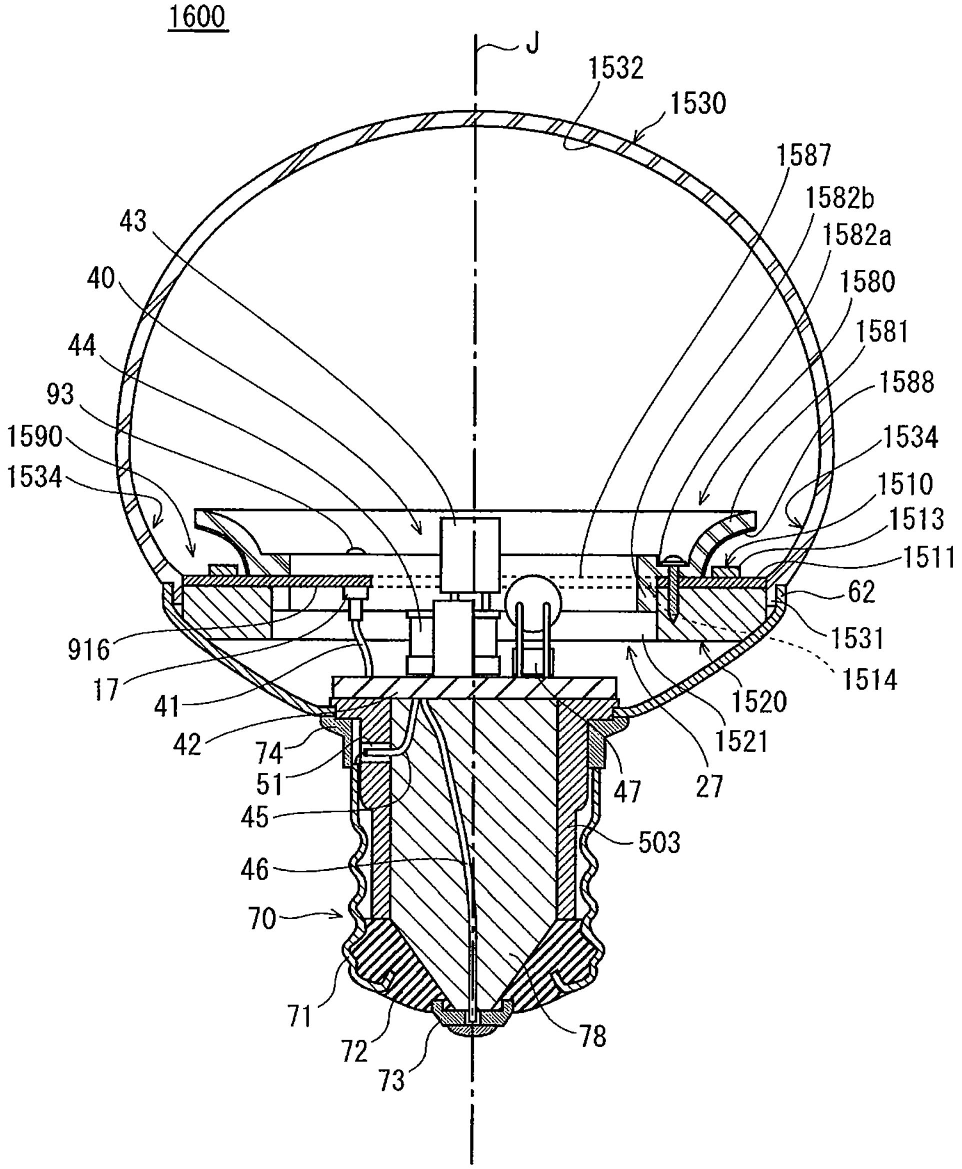
FIG. 24 is a cross-sectional diagram illustrating the overall configuration of a lamp light source pertaining to a twenty-second variation.

(22) Also, FIG. 24 illustrates the configuration of a lamp light source 1600, which is a variation where the insulating thermoconductive filling member 78, made of thermally conductive resin or the like, solidly fills the space between the circuit substrate 42 and the base 70, applied to the eighteenth variation shown in FIG. 21, when appropriate. In such circumstances, the heat produced by the circuit unit 40 is transmitted through the insulating thermoconductive filling member 78 to the base and dissipated, thus constraining heat accumulation in the space.

Figure 25:
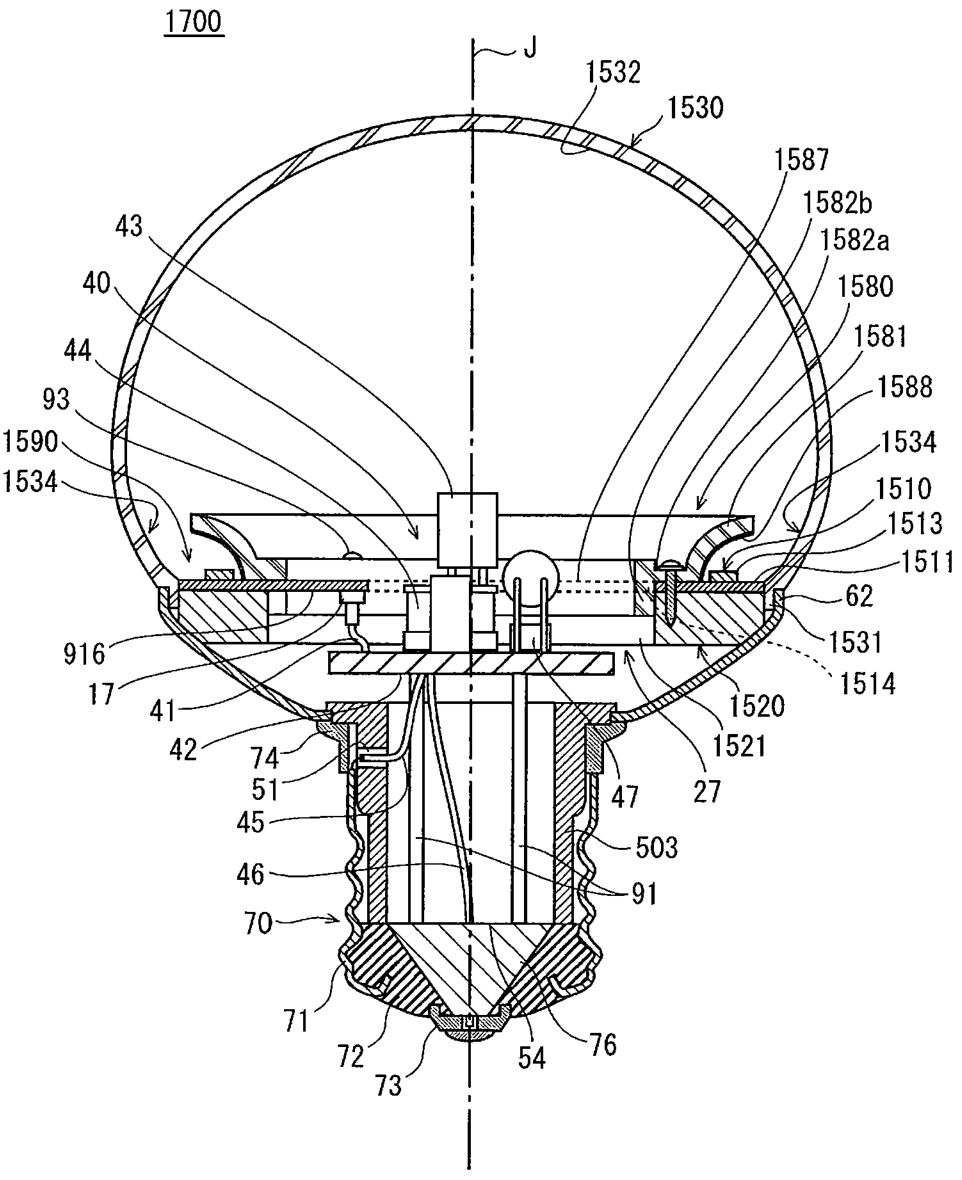
FIG. 25 is a cross-sectional diagram illustrating the overall configuration of a lamp light source pertaining to a twenty-third variation.

(23) The configuration shown in FIG. 21 involves the circuit substrate 42 being fixed to and supported by the tubular portion 503. However, as indicated by lamp light source 1700 shown in FIG. 25, when a gap is provided between the circuit substrate 42 and the tubular portion 503 (i.e., when the two components are separated), the circuit substrate 42 may be supported by the support members 91. Accordingly, the heat produced by the circuit unit 40 is transmitted through the support members 91 to the base 70 and dissipated. Additionally, the space between the circuit substrate 42 and the base 70 is in communication with the gap between the circuit substrate 42 and the tubular portion 503 and with the space within the globe 1530 through the through-hole 1521. Therefore, air is able to circulate through these spaces, thus constraining temperature increases caused to heat accumulation in the space between the circuit substrate 42 and the base 70.

(24) In the above-described Embodiments and variations, the mount 20 is accommodated within the forward edge portion 62 of the case 60 and the globe 30 is installed by inserting the open edge 31 of the globe 30 in space 63 (i.e., the installation groove), which is a gap between the mount 20 and the case 60. Here, for example, an adhesive or similar may be applied to space 63 before the open edge 31 is inserted. The adhesive thus serves to fix the open edge 31 after insertion and fix the mount 20, the globe 30, and the case 60 as a single whole.

Figure 26A:
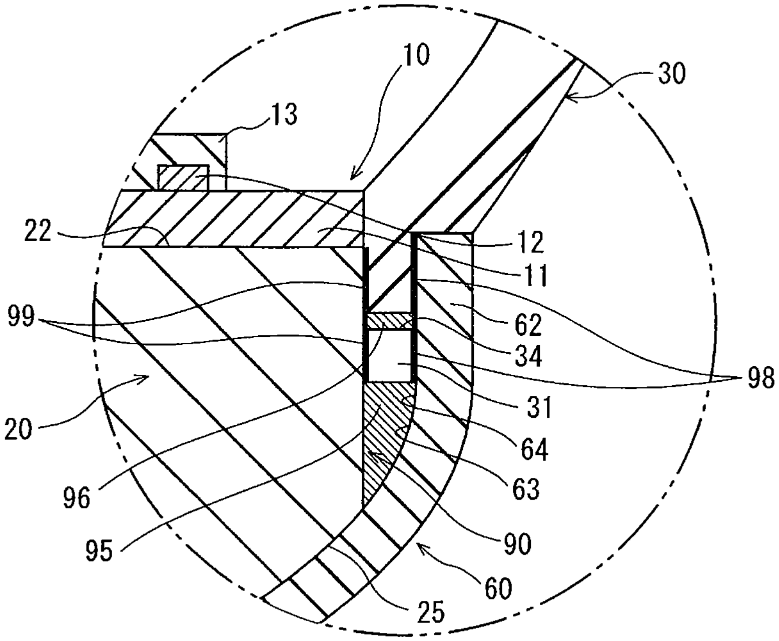
FIG. 26A is a magnified view corresponding to portion D in FIG. 3, pertaining to a twenty-fourth variation of the lamp light source from FIG. 3.

As shown in FIG. 26A, through-hole 34 may be formed so as to pass through the thickness direction of the open edge 31. FIG. 26A is a magnified-view cross-sectional diagram of a lamp light source pertaining to the present variation corresponding to portion D encircled by the double-chained line in FIG. 3.

As shown, when the open edge 31 is inserted into space 63, some of the adhesive applied to space 63 is displaced by the open edge 31 and infiltrates through-hole 34 through a minute gap formed between the outer circumferential surface of the open edge 31 and the inner face 64 of the case 60 and through another minute gap formed between the inner face of the open edge 31 and the outer circumferential surface of the mount 20. Some of the adhesive further infiltrates through-hole 34 beyond the minute gaps. After solidifying, the adhesive is subdividable into adhesive 95 located behind the open edge 31 in space 63, adhesive 96 located within through-hole 34, adhesive 98 forming a thin film in the minute gap between the outer circumferential surface of the open edge 31 and the inner face 64 of the case 60, and adhesive 99 forming a thin film in the minute gap between the inner face of the open edge 31 and the outer circumferential surface of the mount 20. These form a stretch of adhesive working as a whole to keep the mount 20, the case 60, and the open edge 31 of the globe 30 fixed to one another.

The diameter of the through-hole 34 may be, for example, 0.5 mm to 2.5 mm, inclusive. However, no limitation is intended.

Given that adhesive 98 and adhesive 99 are thin films, these portions are represented by thick lines in the drawings for ease of comprehension. The thickness of the lines is not intended to suggest a particular thickness for adhesive 98 and adhesive 99. The same applies to the twenty-fifth variation described below.

Accordingly, the surface contact area between the open edge 31 and the adhesive is increased. This makes the adhesive less likely to easily peel away from the surface of the open edge 31, and in the unlikely case that adhesive 98 and adhesive 99 do peel away, the open edge 31 is prevented from separating from space 63 (i.e., the installation groove) by the anchoring effect of adhesive 96, which is connected to adhesive 95 through adhesive 98 and adhesive 99.

The above-described through-hole 34 is beneficial when provided in at least two locations. Here, through-holes 34 are ideally provided at substantially equal intervals along the circumferential direction of the open edge 31. Accordingly, the load on adhesive 26 is spread out, the risk of breakage is decreased at the junction between adhesive 96 and adhesive 98 or adhesive 99, and the open edge 31 is prevented from separating from space 63 (the installation groove), despite the adhesive peeling away from the open edge 31.

The adhesive applied inside space 63 before the open edge 31 is inserted therein should be provided in a quantity that does not cause the adhesive pressed out by the open edge 31 to surpass either the leading edge of the forward edge portion 62 of the case 60 or the front face 22 of the mount 20. This is beneficial for cost reduction as well as aesthetics. The adhesive may also be applied so as to not surpass the front face of the mounting substrate 11, rather than the front face 22 of the mount 20. The same applies to the twenty-fifth variation, described below.

(25) The configuration described above in the twenty-fourth variation may replace the through-holes in the thickness direction with a dimpled recess in the same direction.

Figure 26B:
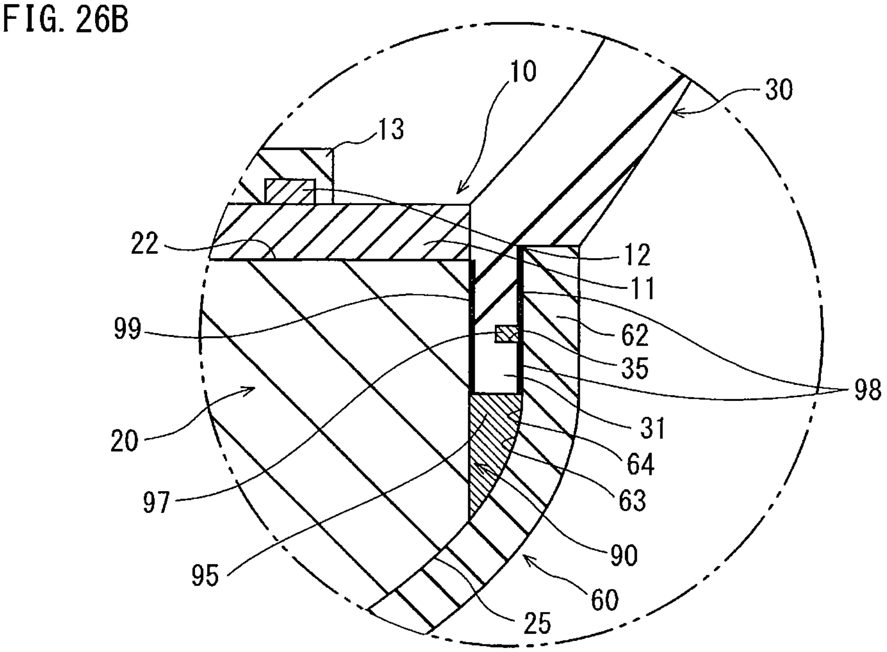
FIG. 26B is a magnified view corresponding to portion D in FIG. 3 pertaining to a twenty-fifth variation of the lamp light source from FIG. 3.

FIG. 26B is a magnified-view cross-sectional diagram of a lamp light source pertaining to the present variation corresponding to portion D encircled by the double-chained line in FIG. 3.

As shown, the outer circumferential surface of the open edge 31 has a dimpled recess 35 formed therein in the thickness direction. As described in the twenty-fourth Embodiment, when the open edge 31 is inserted into space 63, some of the adhesive applied to space 63 is displaced by the open edge 31 and infiltrates the recess 35 through a minute gap formed between the outer circumferential surface of the open edge 31 and the inner face 64 of the case 60. The adhesive then spreads through the minute gap formed between the outer circumferential surface of the open edge 31 and the inner face 64 of the case 60 and through another minute gap formed between the inner face of the open edge 31 and the outer circumferential surface of the mount 20. After solidifying, the adhesive is subdividable into adhesive 95, adhesive 97, adhesive 98, and adhesive 99.

Accordingly, the surface contact area between the open edge 31 and the adhesive is increased. This makes the adhesive less likely to easily peel away from the surface of the open edge 31, and in the unlikely case that adhesive 98 and adhesive 99 do peel away, the open edge 31 is prevented from separating from space 63 (i.e., the installation groove) by the anchoring effect of adhesive 97, which is connected to adhesive 95 through adhesive 98.

The diameter of the dimpled recess 35 may be, for example, 0.5 mm to 2.5 mm inclusive. However, no limitation is intended. The depth of the dimpled recess 35 is dependent on the thickness of the open edge 31. When the open edge 31 is 1 mm thick, then the recess 35 is, for example, 0.8 mm. However, no limitation is intended.

Like the through-holes 34 described in the twenty-fourth variation, the above-described dimpled recess 35 is beneficial when provided in at least two locations. Here, the dimpled recesses 35 are ideally provided at substantially equal intervals along the circumferential direction of the open edge 31. Accordingly, the load on adhesive 97 is spread out, the risk of breakage is decreased at the junction between adhesive 97 and adhesive 98, and the open edge 31 is prevented from separating from space 63 (i.e., the installation groove), despite the adhesive peeling away from the open edge 31.

(26) In the Embodiments and variations described above, groove-like space 63 in which the open edge 31 is inserted is formed by the inner face 64 of the case 60 and the outer circumferential surface of the mount 20. However, no limitation is intended. For example, the exterior of the mount 20 may be provided with an annular member having a groove-like space serving as the installation groove, and the case 60 may be installed in this member. In such circumstances, the mount 20 may be pressed into the annular member or fixed thereto by adhesive or similar. Conversely, the annular member may be press into the case 60, or fixed thereto by adhesive or similar.

Furthermore, given a thin-walled case with a correspondingly thin forward edge portion, mechanical properties such as strength and rigidity can be provided through reinforcing members on the forward edge of the case. For instance, this may take the form of a reinforcing ring pressed into the case, such that the installation groove is formed between the reinforcing ring and the outer circumferential surface of the mount 20.

Furthermore, the installation groove may be formed in the mount 20, or provided on the case 60. For example, an installation groove provided on the case 60 may be realized by folding over an edge of the case 60, which is made of a metallic material.

(27) In the above-described Embodiments and variations, the open edge 31 is described as being continuous along the circumferential direction, and space 63 (i.e., the installation groove) for inserting the open edge 31 is correspondingly described as being a continuous groove in the circumferential direction. However, no limitation is intended. For example, a plurality of protruding open edges 31 may be formed and a groove of sufficient depth to accommodate the protrusions may be formed at a corresponding position in the circumferential direction. In such circumstances, the protruding open edges 31 are desirably substantially equidistant with respect to the circumferential direction. Accordingly, the force applied by the globe 30 on the case 60 is distributed equally with respect to the circumferential direction, and the globe 30 is more reliably secured.

Also, when the installation groove is formed using a separate member, grooves may be provided at positions corresponding to the protruding open edges 31. Further, rather than using a set of annular members, the plurality of members providing the installation groove may be arranged at positions corresponding to the protruding open edge 31.

(28) In the above-described Embodiments and variations, space is provided throughout the entire area between the circuit unit (or the circuit holder) and the light-emitting unit. However, no limitation is intended. For example, the area between the circuit unit (or the circuit holder) and the light-emitting unit may be filled in whole or in part by adiabatic material formed from an insulating member. In such circumstances, the propagation of heat from the light-emitting unit to the circuit unit is suppressed, in turn suppressing temperature increases in the circuit unit.

(29) Further, the space between the circuit unit (or the circuit holder) and the light-emitting unit may be partially filled by an insulating member. In such circumstances, the insulating member need not be adiabatic, as an adiabatic effect is provided by the air in the space between the circuit unit (or the circuit holder) and the light-emitting unit that is not filled by the insulating member. Thus, the propagation of heat from the light-emitting unit to the circuit unit is suppressed to a certain degree.

The individual components of the lamp light sources pertaining to Embodiments 1 and 2, as well as the configurations described in the variations, may be freely combined as appropriate into a given lamp light source. In addition, the materials and dimensions described in the above Embodiments and variations are given as examples, and no limitation is intended thereby. Further, the dimensions and ratios of components indicated by the drawings are intended only as examples. No limitations is intended regarding the dimensions of an actual lamp light source. Further still, appropriate modifications may be made to the lamp light source provided that these do not deviate from the technical concept of the present invention.

INDUSTRIAL APPLICABILITY

The present disclosure is applicable to miniaturizing an LED lamp while preserving the useable life of the circuit unit.

REFERENCE SIGNS LIST

1, 100 Lamp light source
12, 512, 612, 712, 812 Semiconductor light-emitting element
20 Mount
21 Through-hole
27 Gap
30 Globe
40 Circuit unit
42 Circuit substrate
50, 501 Circuit holder
58 Lid
60 Case
65 Gap
70 Base
80, 180, 280, 380 Beam splitter
90 Light-emitting unit
91 Support member

The invention claimed is:

1. A lamp light source, comprising:

a light-emitting unit having a plurality of semiconductor light-emitting elements arranged as a ring on a front face of a mount so as to principally emit light in a frontal direction;

a circuit unit converting externally-supplied electrical power to cause the semiconductor light-emitting elements to emit the light;

an envelope including a globe that is diffusive, transmittant, and disposed so as to cover a front side of the light-emitting unit, and a base receiving the externally-supplied electrical power for causing the semiconductor light-emitting elements to emit the light; and a support member arranged at a distance from the light-emitting unit and supporting the circuit unit in relation to the envelope, wherein a through-hole is formed in the light-emitting unit so that the through-hole passes vertically through the light-emitting unit at a point inside the ring of semiconductor light-emitting elements, the circuit unit is at least partly arranged within the through-hole, a space is provided between the circuit unit and the light-emitting unit, and the support member forms at least part of a heat transmission pathway from the circuit unit to the base, the support member thermally connecting the circuit unit and the base.

2. A lamp light source, comprising:

a light-emitting unit having a plurality of semiconductor light-emitting elements arranged as a ring on a front face of a mount so as to principally emit light in a frontal direction;

a circuit unit converting externally-supplied electrical power to cause the semiconductor light-emitting elements to emit the light;

an envelope including a globe that is diffusive, transmittant, and disposed so as to cover a front side of the light-emitting unit, and a base receiving the externally-supplied electrical power for causing the semiconductor light-emitting elements to emit the light; and a support member arranged at a distance from the light-emitting unit and supporting the circuit unit in relation to the envelope, wherein a through-hole is formed in the light-emitting unit so that the through-hole passes vertically through the light-emitting unit at a point inside the ring of semiconductor light-emitting elements, the circuit unit is at least partly arranged within the through-hole, a space is provided throughout an entire area between the circuit unit and the light-emitting unit, the space completely separating the circuit unit and the light-emitting unit, and the support member forms at least part of a heat transmission pathway from the circuit unit to the base, the support member thermally connecting the circuit unit and the base.

3. The lamp light source of claim 1, further comprising:

a heat conducting member forming at least part of another heat transmission pathway from the circuit unit to the base, the support member thermally connecting the circuit unit and the base.

4. The lamp light source of claim 1 further comprising:

a circuit holder made from an insulating member and accommodating the circuit unit, wherein a distance is open between the circuit holder and the light-emitting unit.

5. The lamp light source of claim 1, further comprising:

a beam splitter disposed in front of the semiconductor light-emitting elements, reflecting a portion of the light emitted by the semiconductor light-emitting elements diagonally backward to avoid the front face of the mount while allowing another portion of the light to pass, wherein the globe has a treated portion on an inner circumferential surface thereof that is more diffusive than the remainder of the inner circumferential surface, the treated portion corresponding to an area reached by the light reflected by the beam splitter.

6. The lamp light source of claim 1, wherein the semiconductor light-emitting elements are arranged in whole or in part at a slant with respect to a lamp axis.

7. The lamp light source of claim 1, wherein the circuit unit is at least partly arranged within the through-hole such that the light-emitting unit surrounds at least a part of the circuit unit.

8. The lamp light source of claim 1, further comprising:

a beam splitter having a substantially annular shape and being disposed in front of the semiconductor light-emitting elements to reflect a portion of the light emitting by the semiconductor light-emitting element diagonally backward while allowing another portion of the light to pass.

9. The lamp light source of claim 3, wherein the circuit unit includes a plurality of electronic components, and the heat conducting member is fixed to a given electronic component producing more heat than other electronic components.

10. The lamp light source of claim 4, wherein the circuit holder is at least partially arranged within the through-hole, and a gap is provided between an outer face of the circuit holder and an inner face of the through-hole.

11. The lamp light source of claim 4, wherein the support member comprises the circuit holder.

12. The lamp light source of claim 4, wherein the envelope further includes a tubular case member that accommodates the light-emitting unit and supports the light-emitting unit in relation to the base, the circuit holder includes (i) a main portion that accommodates at least the part of the circuit unit arranged within the through-hole, and (ii) a tube portion arranged behind the main portion and fixed to the base, when fixed within the main portion of the circuit holder, the circuit unit and the main portion are supported as one by the support member in relation to the envelope, and another gap is provided between the main portion and the tube portion of the circuit holder and the case member.

13. The lamp light source of claim 4, wherein the support member is made of insulating, thermoconductive resin and fills an area between the circuit holder and the base.

14. The lamp light source of claim 4, wherein the circuit unit includes the electronic components, mounted on a front face of a circuit substrate, the circuit substrate is arranged such that a back face thereof is behind the through-hole, and the support member is made of insulating, thermoconductive resin and fills an area between the base and the back face of the circuit substrate.

15. The lamp light source of claim 12, wherein, the globe is fixed to the case member of the envelope with an adhesive applied within an installation groove in a forward edge portion of the case member and dried with an open edge of the globe inserted into the installation groove, and the open edge has a plurality of through-holes formed therethrough in a thickness direction.

16. The lamp light source of claim 12, wherein, the globe is fixed to the case member of the envelope with an adhesive applied within an installation groove in a forward edge portion of the case member and dried with an open edge of the globe inserted into the installation groove, and the open edge has a plurality of dimples formed therein in a thickness direction.

17. The lamp light source of claim 5, wherein the treated portion is a uniform series of semispherical primary dimples formed in the inner circumferential surface of the globe, each having a uniform series of smaller secondary dimples formed therein.

18. The lamp light source of claim 17, wherein each of the primary dimples has a depth of 20 μm to 40 μm, inclusive, and each of the secondary dimples has a depth of 2 μm to 8 μm, inclusive.

19. The lamp light source of claim 2, wherein the circuit unit is at least partly arranged within the through-hole such that he light-emitting unit surrounds at least a part of the circuit unit.

20. The lamp light source of claim 2, further comprising:

a beam splitter having a substantially annular shape and being disposed in front of the semiconductor light-emitting elements to reflect a portion of the light emitting by the semiconductor light-emitting element diagonally backward while allowing another portion of the light to pass.

* * * * *